(12) United States Patent
Figler et al.

(10) Patent No.: US 8,016,415 B2
(45) Date of Patent: Sep. 13, 2011

(54) EYEWEAR INCORPORATING LENSES WITH ELECTRONICALLY VARIABLE OPTICAL PROPERTIES

(75) Inventors: Jonathan Figler, Solon, OH (US); Tamas Kosa, Hudson, OH (US); Roy Miller, Stow, OH (US); Christine Martincic, Brunswick, OH (US); Eui-Yeul Park, Hudson, OH (US); Bahman Taheri, Shaker Heights, OH (US)

(73) Assignee: Alphamicron Incorporated, Kent, OH (US)

( * ) Notice: Subject to any disclaimer, the term of this patent is extended or adjusted under 35 U.S.C. 154(b) by 14 days.

(21) Appl. No.: 12/438,856

(22) PCT Filed: Sep. 10, 2007

(86) PCT No.: PCT/US2007/019631
§ 371 (c)(1),
(2), (4) Date: Feb. 25, 2009

(87) PCT Pub. No.: WO2008/033290
PCT Pub. Date: Mar. 20, 2008

(65) Prior Publication Data
US 2009/0251660 A1   Oct. 8, 2009

Related U.S. Application Data

(60) Provisional application No. 60/843,599, filed on Sep. 11, 2006, provisional application No. 60/919,416, filed on Mar. 22, 2007.

(51) Int. Cl.
*G02C 1/00* (2006.01)

(52) U.S. Cl. .................. 351/158; 351/121; 351/153

(58) Field of Classification Search .............. 351/41, 351/111–121, 153, 158; 16/228; 349/13, 349/14, 15
See application file for complete search history.

(56) References Cited

U.S. PATENT DOCUMENTS

| | | | |
|---|---|---|---|
| 5,067,795 A | 11/1991 | Senatore | 359/84 |
| 5,455,637 A | 10/1995 | Kallman et al. | 351/44 |
| 5,463,428 A * | 10/1995 | Lipton et al. | 351/158 |
| 6,213,602 B1 | 4/2001 | Smarto | 351/159 |
| 6,349,001 B1 * | 2/2002 | Spitzer | 359/618 |
| 6,824,265 B1 | 11/2004 | Harper | 351/158 |
| 6,857,741 B2 | 2/2005 | Blum et al. | 351/168 |
| 7,404,636 B2 | 7/2008 | Blum et al. | 351/159 |
| 7,425,066 B2 | 9/2008 | Blum et al. | 351/159 |
| 2005/0242771 A1 | 11/2005 | Blum et al. | 320/114 |
| 2007/0281752 A1 | 12/2007 | Lewis | 455/569.1 |

FOREIGN PATENT DOCUMENTS

| | | |
|---|---|---|
| EP | 1 727 393 | 11/2006 |
| WO | WO 2004/019078 A2 | 3/2004 |
| WO | WO 2005/033782 A2 | 4/2005 |
| WO | WO 2006/126881 A2 | 11/2006 |

* cited by examiner

*Primary Examiner* — Huy K Mai
(74) *Attorney, Agent, or Firm* — Renner Kenner Greive Bobak Taylor & Weber

(57) ABSTRACT

An electro-optic eyewear assembly having a frame with opposed ends, a pair of temples, and a hinge mechanically interconnecting each temple to a corresponding end of the frame. Each temple moveable between a wearing position and a storage position and at least one electro-optic lens carried by the frame and a control circuit carried by at least one of the temples. The electrical connection between the control circuit and the at least one electro-optic lens being made by moving one of the temples into physical contact with the frame when the temple carrying the control circuit is moved to a wearing position.

14 Claims, 19 Drawing Sheets

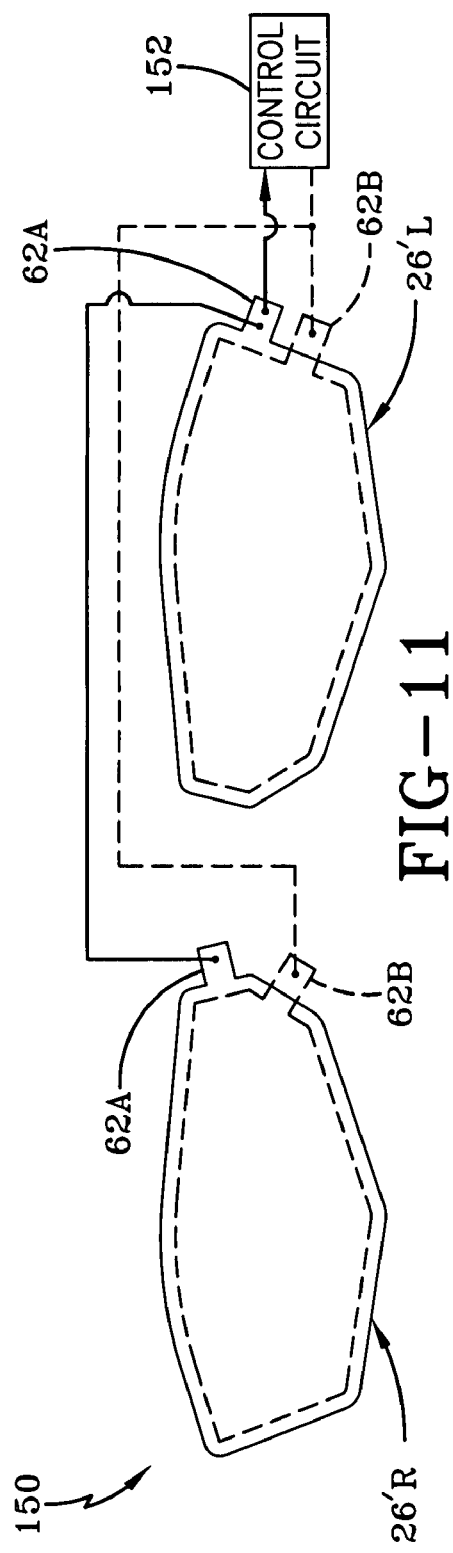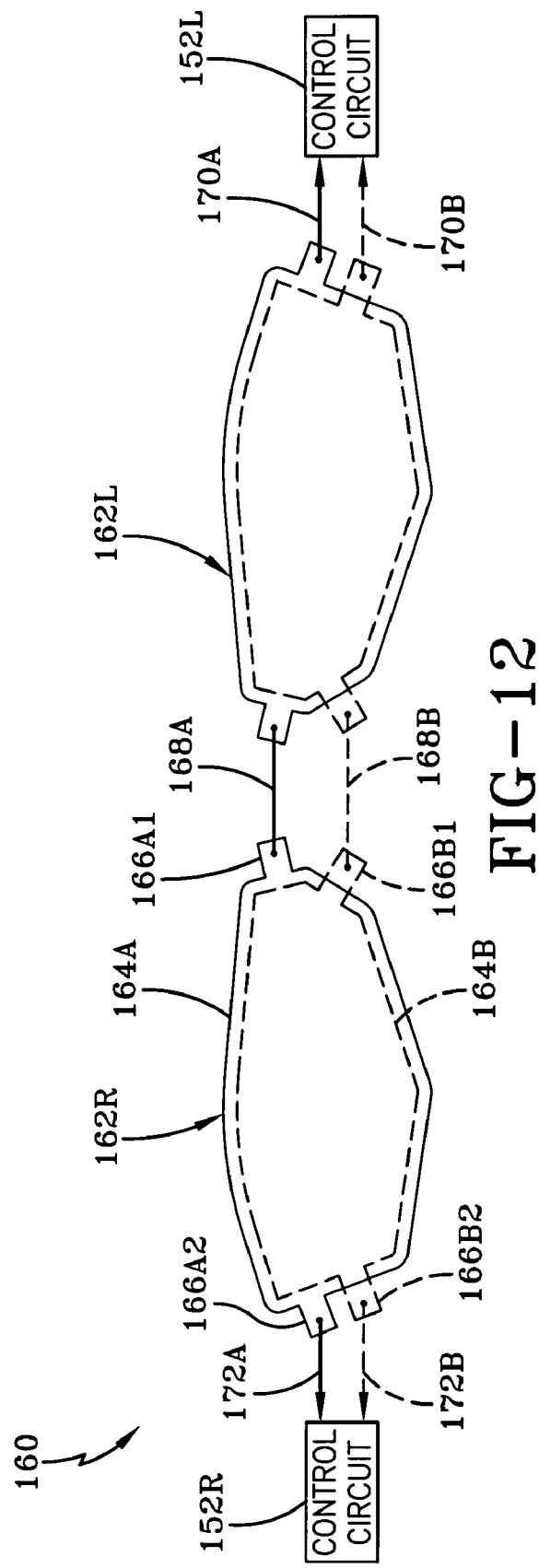

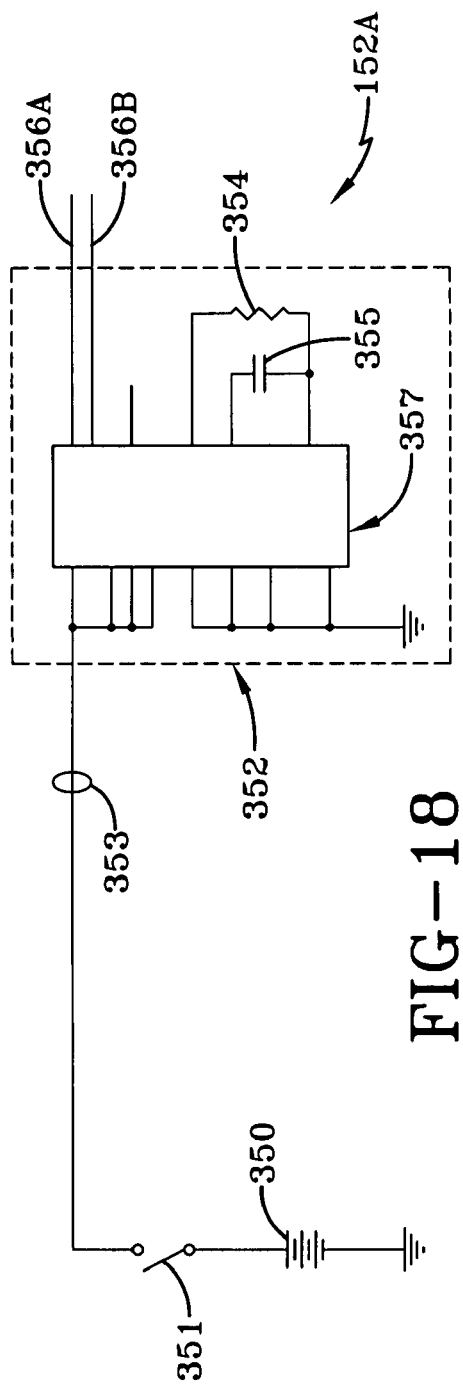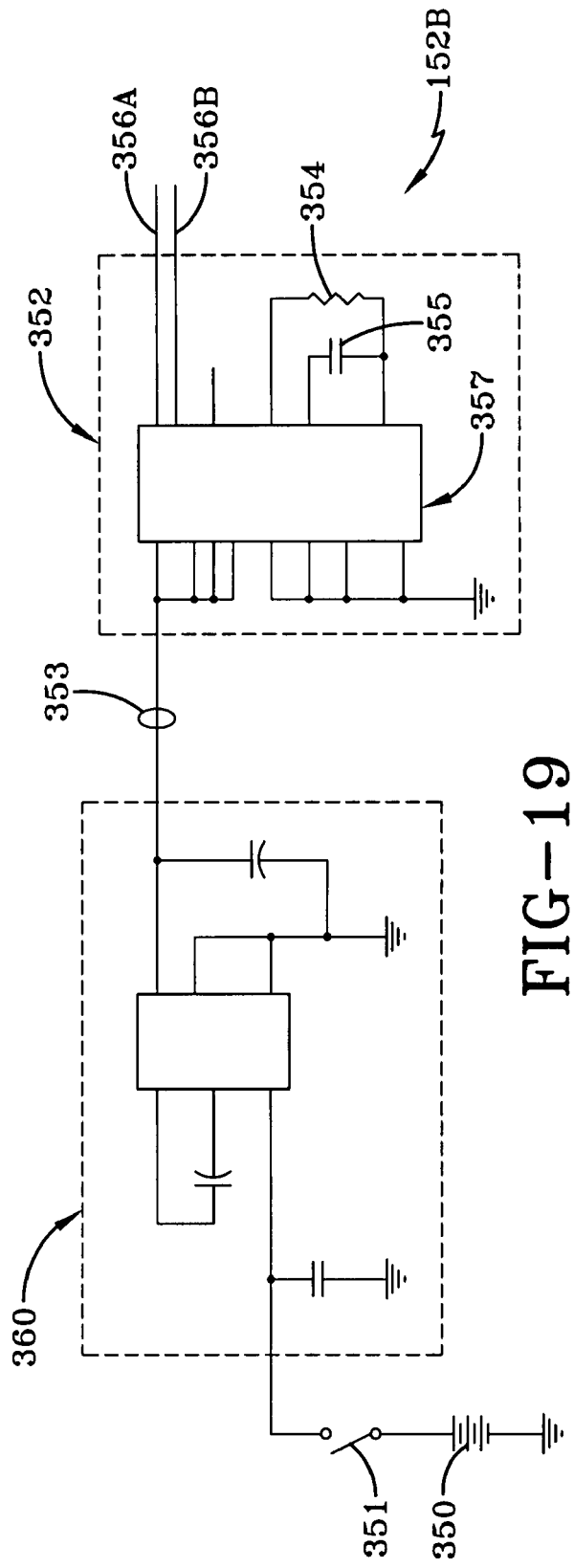
FIG-18
FIG-19

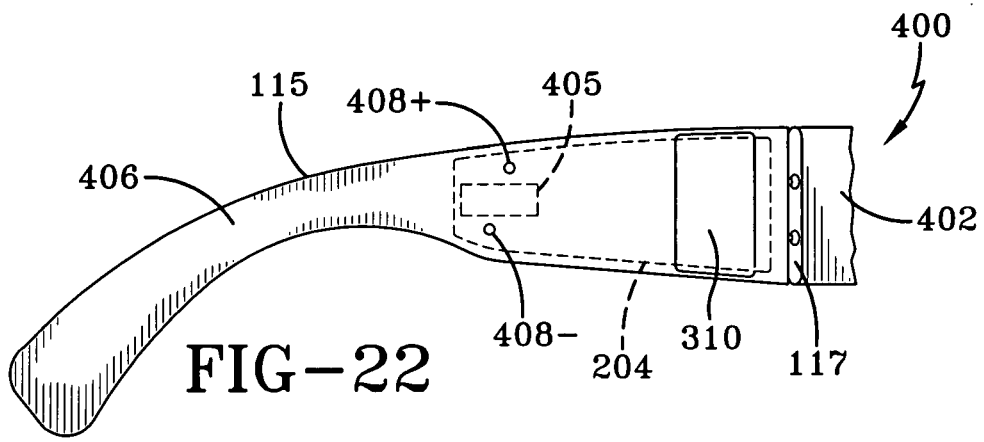
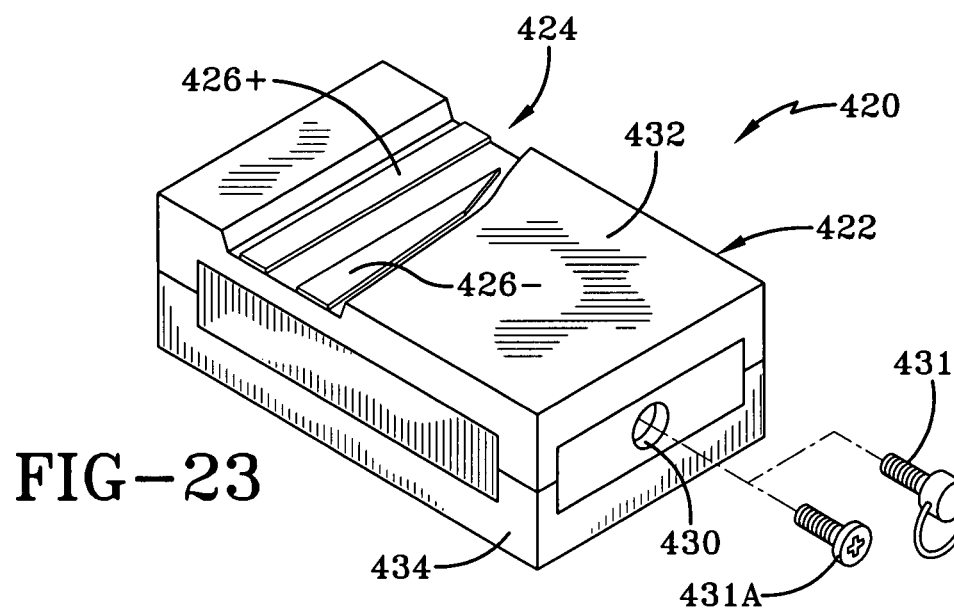
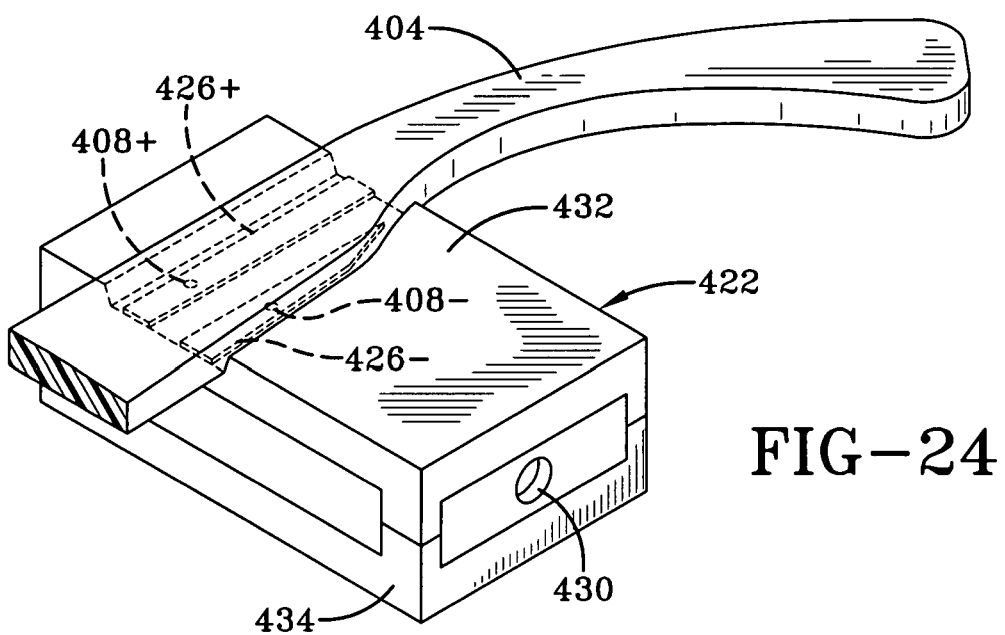

EYEWEAR INCORPORATING LENSES WITH ELECTRONICALLY VARIABLE OPTICAL PROPERTIES

CROSS-REFERENCE TO RELATED APPLICATIONS

This application claims priority of U.S. Provisional Application Ser. Nos. 60/843,599 filed Sep. 11, 2006 and 60/919,416 filed Mar. 22, 2007, both of which are incorporated herein by reference.

TECHNICAL FIELD

The present invention is generally directed to eyewear. More specifically, the present invention is directed to eyewear with lenses using electronically controllable variable optical properties such as those available with liquid crystal materials.

BACKGROUND ART

Eyewear is believed to have been developed in Europe and China during the thirteenth century. It is also believed that primitive man used shields made from bone and/or wood to protect their eyes from sun and wind. Primarily, eyewear was developed for functional reasons, namely to improve the wearer's vision and to protect their eyes from environmental elements. As time passed, eyewear as a fashion accessory became common.

Eyewear has many basic components and generally accepted terminology. Frames, primarily made of plastic, metal, or the like, are provided for holding lenses positionable in close proximity to the eyes of the wearer. A bridge, which is typically integral with the frame, typically rests on the wearer's nose and provides a natural resting spot for the frame. A hinge may be mounted to the frames at each side and temples, which are proximal the wearer's head, extend from the other side of each hinge. Earpieces may extend downwardly from the temples near the wearer's ears to further secure the eyewear.

The frame, which holds the lenses that correct or otherwise alter the wearer's vision, includes a frame front. The two temples may be replaced with a single strap that goes around the head such as used in goggles. New advances in materials, memory metals in particular, permit the replacement of a traditional hinge with a continuous structure and suggest that the term "joint" may be used instead of hinge. Indeed, the term "joint" may also be more appropriate for eyeglasses employing a strap instead of temples. The frames provide a frame cavity, which may also be referred to as an aperture, to carry a lens. The left lens is typically referred to as ocular sinister (OS) and the right lens is typically referred to as ocular dexter (OD).

Currently in the eyewear industry, frames are designed independently of the lenses that will be fitted to the frames. Within reason, lenses are selected according to the required prescription and then ground as necessary to fit the frame. The frame manufacturers know the general properties of the lenses that will be fitted to their frames, but consideration of the specific lenses does not generally occur. Unfortunately, this approach does not facilitate assembly of eyewear with a specific electro-optic lens design, wherein the electro-optic materials may be selected from liquid crystals, electro-chromics, electro-phoretics and the like. Such a lens design dictates certain frame design characteristics. For example, a lens using electro-optic material requires opposed substrates with a controlled gap designed to receive the material. Such a configuration does not allow the lens to be ground arbitrarily to a shape that will fit into an eyewear frame.

Frames generally fall into one of three categories: rimmed, semi-rimless, and rimless. In a rimmed configuration, the lens aperture is completely encircled by the frame. In a semi-rimless configuration, a partial frame carries the lens, although the frame may include a filament which functions to hold the lens in place without providing the appearance of a rim. And in a rimless configuration, the lenses are directly carried by the temples and/or bridge so that no frame encircles the lens or lenses.

The hinges between the temples and the frames may be provided in a number of different constructions. The standard friction hinge is a discrete hinge that attaches the temples and frame front to one another. A spring hinge may also be provided wherein a spring is utilized to bias the connection between the temples and frame front so as to provide a more secure or snug fit on the head of the person wearing the eyewear. An integrated hinge utilizes fingers, or leafs, which are an extension of the respective temples and frame front and wherein a hinge pin is added to connect the fingers and leafs to one another. As mentioned previously, a continuous hinge may be provided wherein the frame front and temples are continuous or integral with one another.

Prior art eyewear utilizes frame rims which are elastically distorted to permit a rigid lens, provided with or without a beveled edge, to be inserted into the frame aperture. Plastic frames are often heated to increase the elasticity of a material so as to allow for the distortion which is relatively small. Metal frames may also be used and often have mechanical joints that are opened to accommodate the rigid lens. It will be appreciated that large deformations are possible with metal frames so as to allow for insertion of appropriate sized lenses.

As noted, attempting to incorporate an electro-optic device into a prior art eyewear frame is problematic. Indeed, given the basic form and construction of a liquid crystal device or any device which uses an electro-optic material that can be used as a lens, special features must be incorporated into an eyeglass frame to accommodate such a lens. As will be understood by a skilled artisan, electro-optic lenses have an edge seal wherein a glue or adhesive bead with different electro-optical properties than the active area—the area containing the electro-optic material—is provided. It will be appreciated that it is desirable to hide the edge seal within the eyewear frame. Moreover, these types of lenses require protruding tabs to serve as electrodes for allowing application of a desired electrical waveform or voltage to the electro-optic material. Accordingly, the lens, the edge seal, and/or the electrode tabs are typically not robust enough to survive insertion into an elastically deformed frame. This is especially true in sunglasses which do not employ a carrier lens. In other words, in generally ophthalmic eyewear applications, a corrective lens is provided which provides a substantial carrier or base to which the liquid crystal device may be attached. As such, the rigidity of the carrier is able to withstand the forces required to insert the lens into the eyewear. However, an electro-optic lens, such as a liquid crystal lens, by itself, cannot withstand such forces. It will further be appreciated that the electro-optic lenses require batteries, drive circuits, switches and other interconnecting conductors for operation. These components must be located somewhere in or on the frame while maintaining an aesthetically pleasing appearance or indeed, be totally unobservable by the wearer or the casual observer.

Based upon the foregoing problems, it will be appreciated that the requirements of both the electro-optic lenses and the supporting components, require that eyeglass frames be more mechanically complex than prior art eyeglass frames regardless of materials used. Distortion of the frames must be accomplished in such a way that the lens or lenses can be inserted into the frame aperture. And it will also be appreciated that elastic distortion of the lens must be avoided so as to ensure the integrity of the lens and the associated electronic components. It is submitted that the known prior art does not address the details of incorporating the lenses, drive circuits, batteries, and interconnections into the frames in an attractive manner. As such there is a need for incorporating the lenses or single lens into rimmed, semi-rimless or rimless design configurations. There is also a need for circuit interconnections, driving circuits, and re-charging devices and related circuits that are adapted for use with electro-optic lenses.

DISCLOSURE OF INVENTION

In light of the foregoing, it is a first aspect of the present invention to provide eyewear incorporating lenses with electronically variable optical properties.

It is another aspect of the present invention to provide an electro-optic eyewear assembly comprising a frame having opposed ends, at least one moveable temple, a hinge mechanically interconnecting the temple to a corresponding end of the frame, wherein the temple is moveable between a wearing position and a storage position, at least one electro-optic lens carried by the frame, and a control circuit carried by the temple, wherein electrical connection between the control circuit and the at least one electro-optic lens is made by moving the temple carrying the control circuit to a wearing position.

Still another aspect of the present invention is to provide a battery recharging unit adapted for use with an electro-optic eyewear assembly having a frame and connected to temples, wherein the assembly carries a re-chargeable battery, the unit comprising a housing having a temple cavity, the temple cavity adapted to receive the eyewear assembly temples, and a recharge circuit carried by the housing, the recharge circuit having recharge pads maintained in the temple cavity, wherein the recharge pads are connectable to the re-chargeable battery.

BRIEF DESCRIPTION OF THE DRAWINGS

For a complete understanding of the objects, techniques and structure of the invention, reference should be made to the following detailed description and accompanying drawings wherein:

FIG. 11 is a schematic diagram of an eyewear assembly utilizing a two contact arrangement according to one embodiment of the present invention;

FIG. 12 is a schematic diagram of an eyewear assembly utilizing a four contact arrangement according to another embodiment of the present invention;

FIG. 18 is a schematic diagram of an alternative drive circuit utilized in accordance with any one of the electro-optic eyewear embodiments described herein;

FIG. 19 is a schematic diagram of another alternative drive circuit utilized in accordance with any one of the electro-optic eyewear embodiments described herein;

FIG. 22 is an elevational view of a temple showing recharging contacts used in another embodiment of the present invention;

FIG. 23 is a front perspective view of a recharging unit according to the present invention;

FIG. 24 is a perspective view showing the temple coupled to the recharging unit;

BEST MODE FOR CARRYING OUT THE INVENTION

Figure 1:
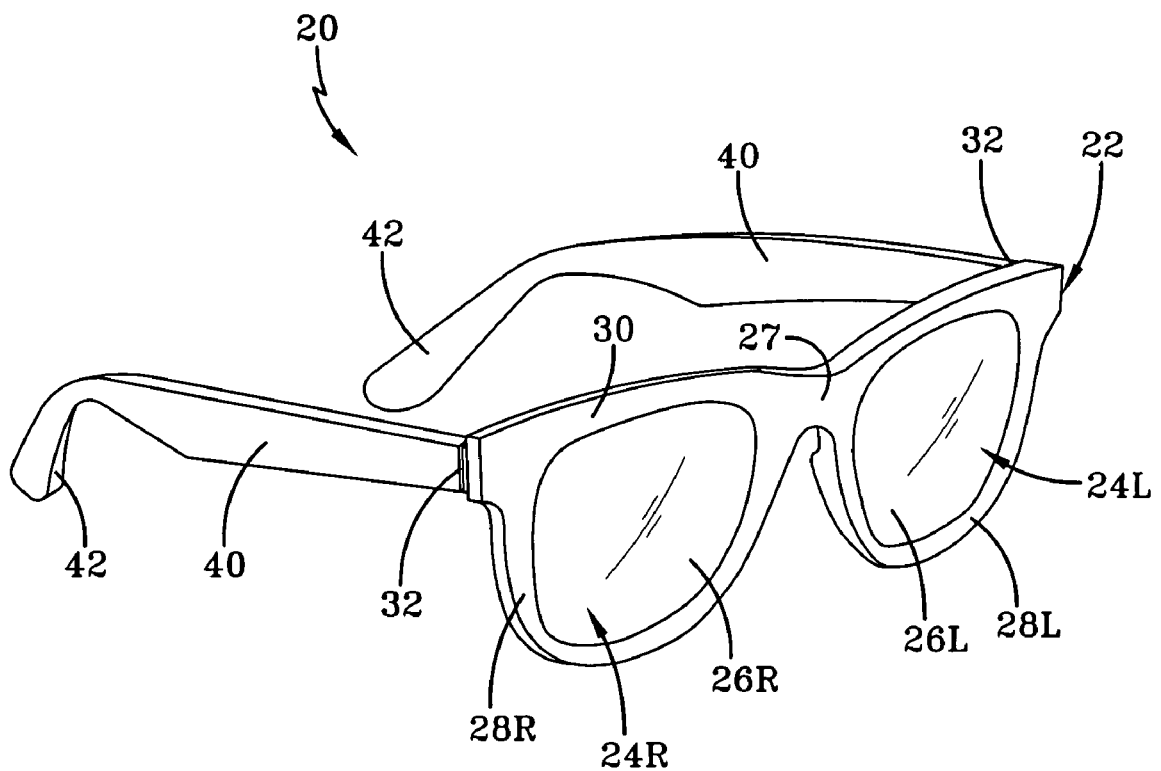
FIG. 1 is a perspective view of a prior art eyewear assembly.

Referring now to the drawings, and in particular to FIG. 1, it can be seen that a prior art eyewear assembly is designated generally by the numeral 20. It will further be appreciated that the eyewear assembly may also be referred to as glasses, spectacles, or the like. The eyewear assembly includes a frame 22 which provides at least one aperture 24 which carries a lens 26, which may also be referred to as an optical device. In most eyewear, it will be appreciated that two apertures are provided wherein each aperture is associated with the wearer's eye. Accordingly, the apertures, lenses and other related components associated with the wearer's left eye are provided with a capital letter L suffix and the aperture, lens and other components associated with the wearer's right eye are provided with a capital letter R suffix. The frame 22 may include a bridge 27 which separates a rim 28L from a rim 28R. And the frame may be provided in either a rimmed, semi-rimless or rimless configuration. The frame 22 provides a frame front 30 upon which may be mounted a hinge 32. Although not shown in detail, it will be appreciated that the hinge 32 may provide a frame finger that is secured to the frame front wherein a temple finger, which is secured to a temple 40, mates with the frame finger and is interconnected thereto by a pin. Although not shown, the hinge may be provided in a spring-biased configuration. As noted, the temple 40 extends from the temple finger or from the frame front and is aligned to be adjacent the head of the wearer in such a manner that the eyewear is easily carried by the user's head. If desired, an earpiece 42 may extend from each temple 40 so as to facilitate retention of the eyewear assembly upon the wearer's head. In typical eyeglass or eyewear configurations, a lens is carried within the aperture 24 to provide vision correction in any number of configurations. In other words, the lenses may be configured to improve near-sightedness, far-sightedness and other eye-related impairments. And lenses may be shaded or tinted to provide protection from sun glare, ultraviolet light and the like. It will also be appreciated that tinted eyewear may be utilized as a fashion accessory to match physical attributes or clothing of the person wearing the eyewear.

Figure 2:
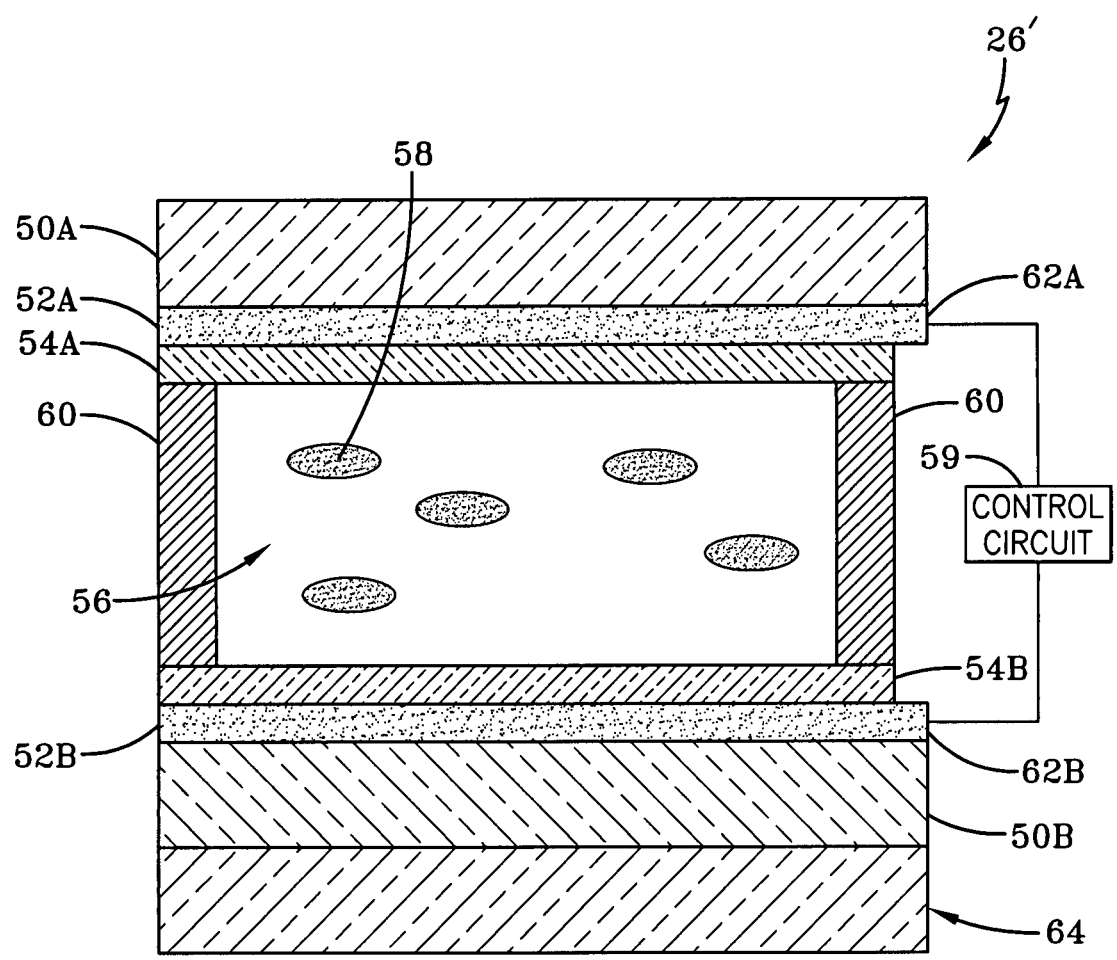
FIG. 2 is an elevational, cross-sectional schematic of an electro-optic device, such as a liquid crystal lens, used in eyewear according to the present invention.

Referring now to FIG. 2, it will be appreciated that the present invention may employ a liquid lens construction designated generally by the numeral 26'. Although a liquid crystal lens construction is described below for the lens 26', it will be appreciated that any electrically-active optical material, such as electro-chromic or electro-phoretic could be used in place of the liquid crystal material. And the lens construction could be used in a visor or goggle configuration, or two lenses could be used, one for each eye. Such liquid crystal lens constructions are disclosed in U.S. Pat. Nos. 6,239,778; 6,690,495; 7,102,602; all of which are incorporated herein by reference.

The lens 26' may comprise spaced apart, opposed substrates 50A and 50B, wherein each substrate provides corresponding transparent electrode layers 52A and 52B, which are typically formed from indium tin oxide or other appropriate conductive material. As will be discussed, electrode layers allow for application of a voltage across a gap between the substrates. The substrates may be flat, curved, or doubly curved. The material used for the substrates 50 may be glass or plastic, and if plastic, a flexible or rigid material may be used. If required, an alignment layer 54 may be disposed on each electrode layer or just one of the electrode layers. The alignment layers preferentially align the liquid crystal molecules adjacent to the alignment layers; wherein the molecules are part of the liquid crystal material received between the substrates. A gap is typically provided between the substrates and may be maintained by spacers, as is commonly known in the art. Accordingly, the opposed substrates 50 form a gap 56 which receives a liquid crystal or other electro-optic material. Each electrode layer 52 is connected to a control circuit 59 which typically includes a switch, a power supply and a drive circuit. The control circuit applies a voltage and/or voltage waveform in an appropriate manner to change the orientation of the liquid crystal material. As such, by changing the orientation of the liquid crystal material, various optical properties—absorption, no absorption, high transmission, low transmission, and the like—may be obtained.

An edge seal 60 is provided around or about the outer periphery of the liquid crystal lens 26' so as to retain the liquid crystal material between the substrates. It will be appreciated that the edge seal and associated area is not an optically active area. Accordingly, it is desirable to keep the edge seal periphery area hidden or otherwise concealed within the frame of the eyewear. Depending on the frame configuration—rimmed, semi-rimless, or rimless—the optical device or lens 26' may utilize substrates 50 which are sufficiently rigid. For example, if a semi-rimless or rimless configuration is utilized, then at least one of the substrates needs to be sufficiently rigid in order to maintain the desired shape and allow electrical and mechanical connections to the power and driving electronics. In some embodiments, one or both of the substrates could be a 1 millimeter thick polycarbonate material. Alternatively, in other embodiments, a sufficiently rigid carrier lens 64 may be secured or positioned adjacent one or both substrates 50. In such an embodiment, the rigid carrier lens 64 may be a polycarbonate material, which could be of ballistic grade, and which has a thickness ranging between 1 to 3 millimeters.

Figure 3:
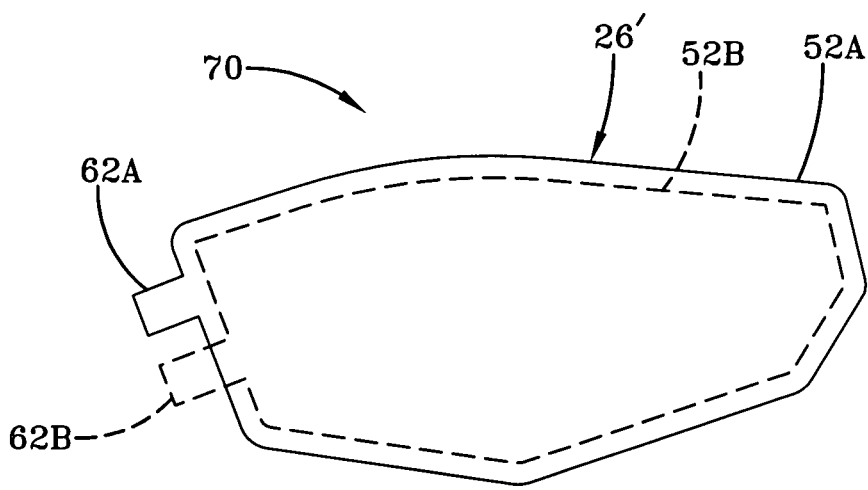
FIG. 3 is a schematic diagram of electrode layers and their associated tabs which are utilized in the electro-optic device according to the present invention.

Referring now to FIG. 3, it will be appreciated that the lens 26' utilizes an electrode configuration to allow for attachment to the control circuit 59. As such, each electrode 52 provides an electrode tab 62, supported by the substrate 50, which extends outwardly from the substrates in such a manner so as to allow for connection to the control circuit. As shown in FIG. 3, the electrode layer 52A provides an electrode tab 62A, while electrode layer 52B provides an electrode tab 62B. For the purpose of clarity, the other components of the liquid crystal lens 26 are not shown in FIG. 3. However, the tabs 62A and 62B are sized in such a way that they extend beyond the edges of at least one of the substrates to allow electrical connection thereto. The electrode layers are typically identical in shape except for the location of the electrode tabs. For clarity, the outlines of the two overlapped electrode layers are drawn schematically as separated to distinguish between the layers. It will further be appreciated that care must be taken in interconnecting the control circuit to the electrode tabs such that the connection therebetween remains secure for a long period of time and is not subject to adverse wear.

Frame Splits

Figure 4:
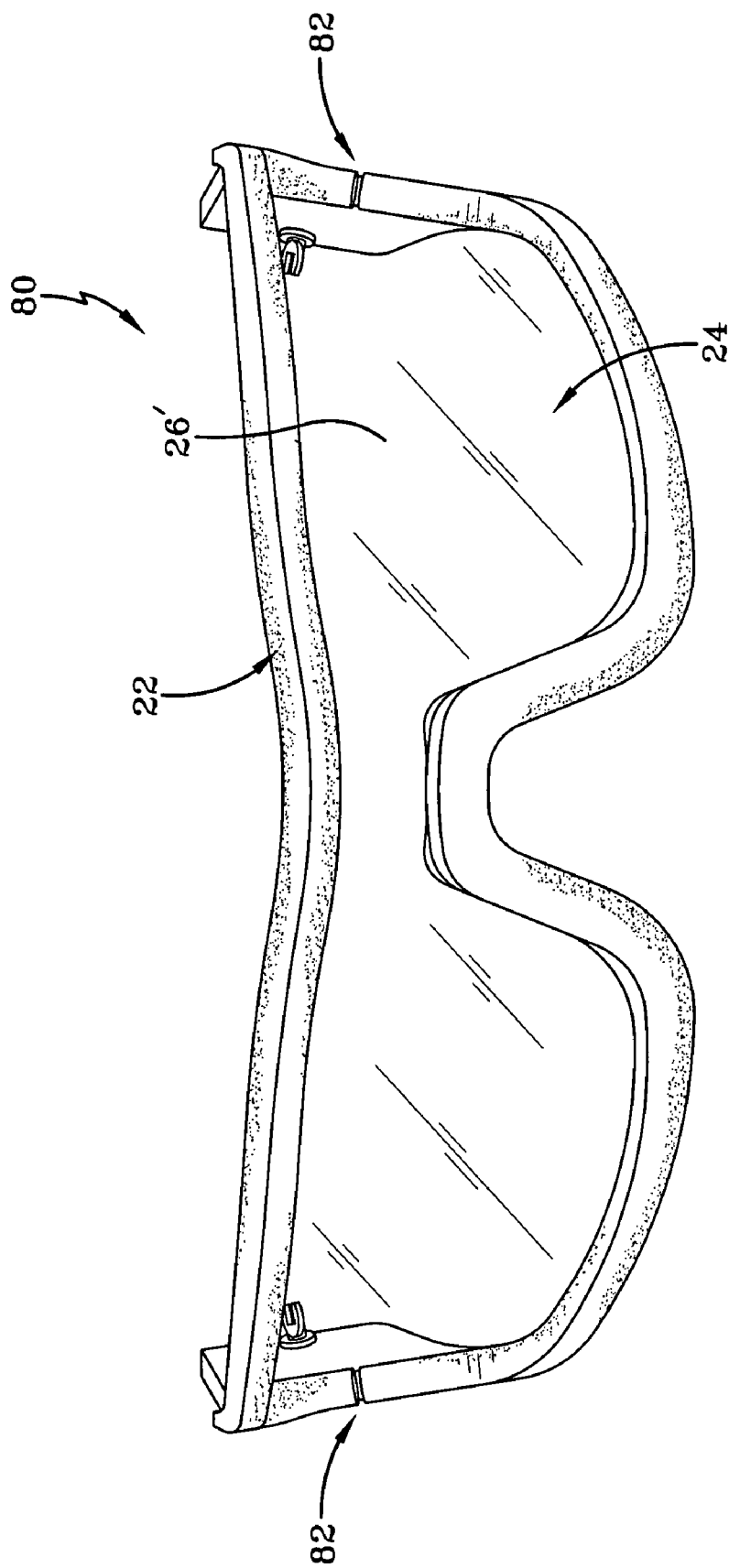
FIG. 4 is a perspective view of a transverse split frame having a single aperture according to the present invention.
Figure 5:
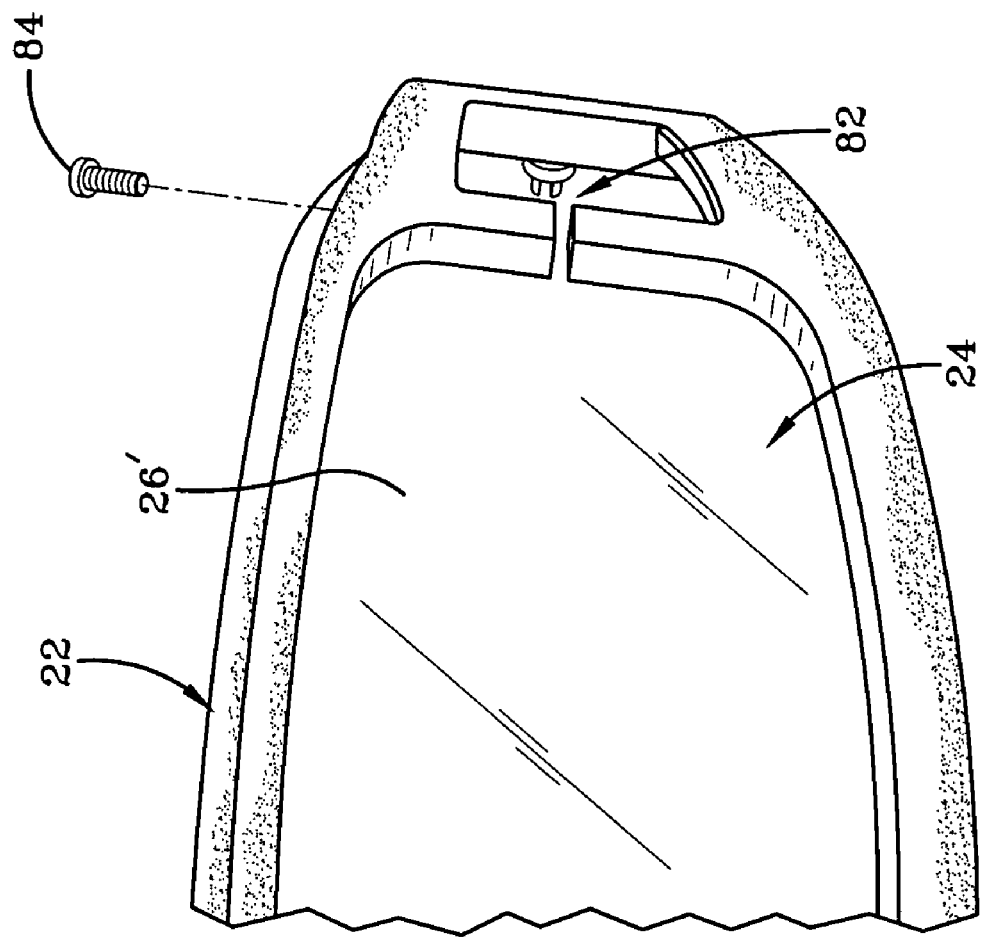
FIG. 5 is a detailed view of the transverse split frame showing a split.

Referring now to FIG. 4, it can be seen that a frame 22 is provided with a single aperture 24. In this particular construction, a transverse split frame is designated generally by the numeral 80 with a single aperture. Disposed at at least one end of the frame 80 is at least one split 82 which separates the frame in such a manner so as to allow for distortion s thereof for insertion of a liquid crystal lens therein. Once the lens 26' is appropriately positioned, a fastening device 86 may be inserted through the frame to reestablish continuity of the frame and close the split 82 in such a manner to retain the lens 26'. It will be appreciated by those skilled in the art that the positioning of the split 82 may be in any location, although it is believed that it will be positioned in such a manner so as to minimize detection thereof. FIG. 5 shows a detailed view of the split 82.

Figure 6A:
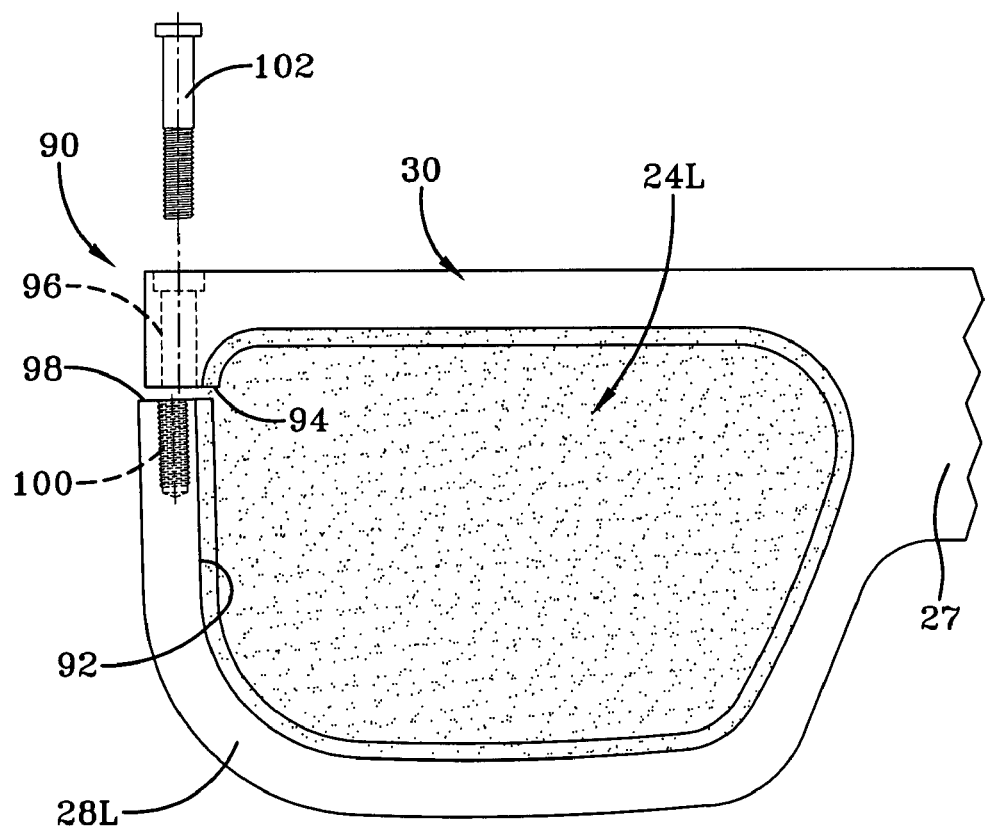
FIG. 6A is a partial elevational view of another embodiment of a transverse split frame shown in an unassembled condition.
Figure 6B:
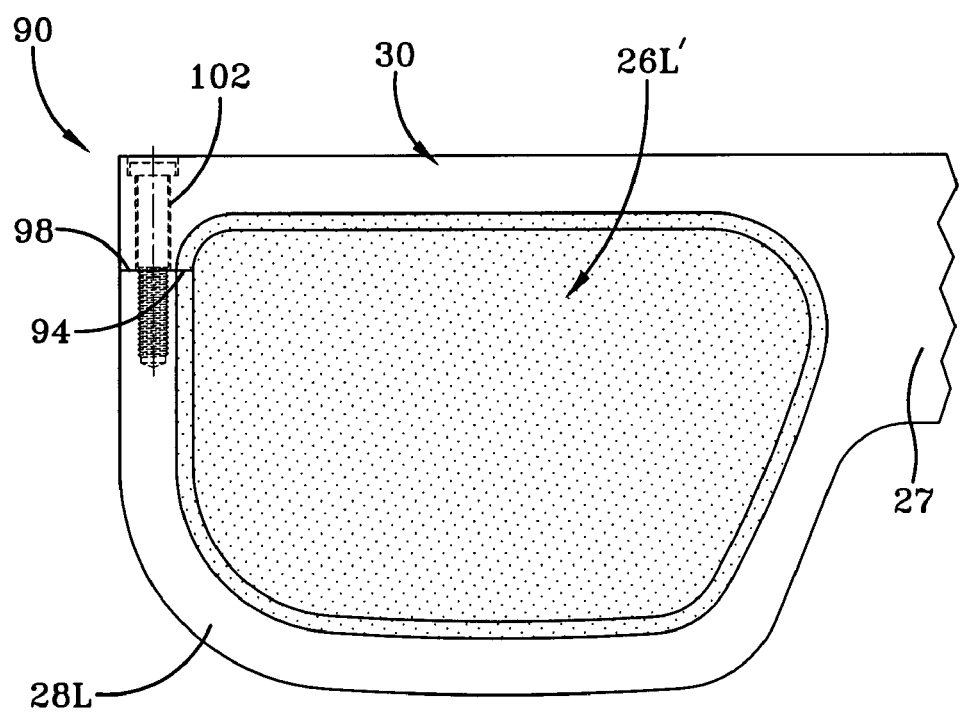
FIG. 6B is a partial elevational view of the transverse split frame of FIG. 6A shown in an assembled condition.

Referring now to FIGS. 6A and 6B, it will be appreciated that a transverse split frame designated generally by the numeral 90 may also be utilized with a double aperture frame construction. Specifically, the frame 90 includes a frame front 30 and a rim 28L. A ledge 92 is provided by an interior surface of the frame front and is disposed about the aperture 24L so as to provide peripheral edge support of the received liquid crystal lens 26'L. The rim 28L provides a frame split surface 94, wherein a frame bore 96 extends through the frame front and the frame surface. Likewise, the rim 28L provides a rim split surface 98 which provides a rim bore 100 therethrough and which is aligned with the frame bore 96. With the split surfaces spaced apart, the liquid crystal lens 26'L may be inserted into the aperture 24L and then secured by insertion of a fastener 102 through the frame bore 96 so that it is received by the rim bore 100. It will further be appreciated that the splits may be provided anywhere about the frame and/or rim to allow for slight separation of the frame from the rim so as to allow receipt of the lens and conceal its peripheral edge. It will further be appreciated that additional mechanical retention, or other fastening devices, may be provided so as to mechanically constrain the lens in the frame without adversely affecting the positioning of the electrode tabs.

Figure 7:
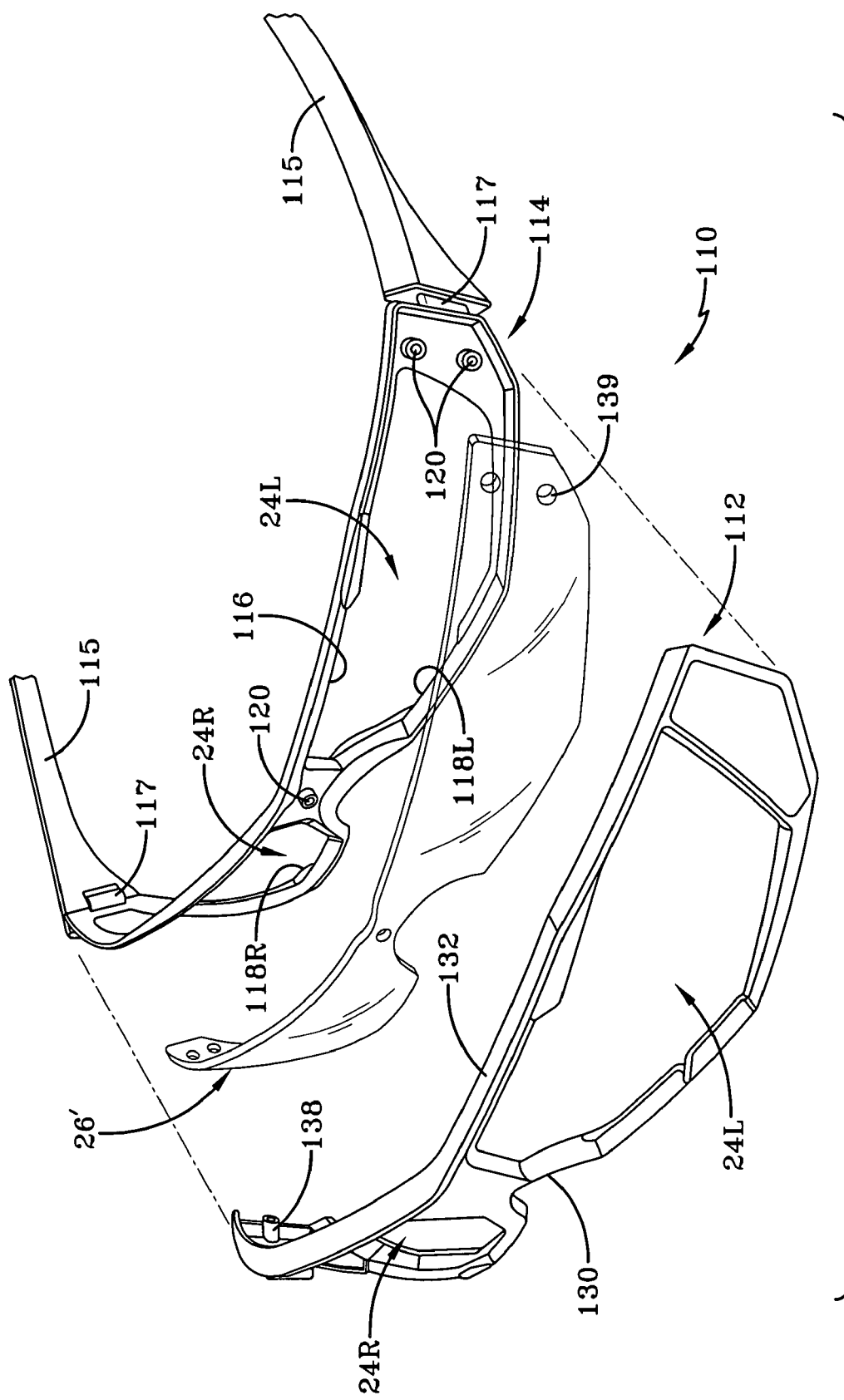
FIG. 7 is a front perspective view of a laterally split frame illustrating an exterior frame and an interior frame with an electro-optic lens received therebetween according to another embodiment of the present invention.
Figure 8:
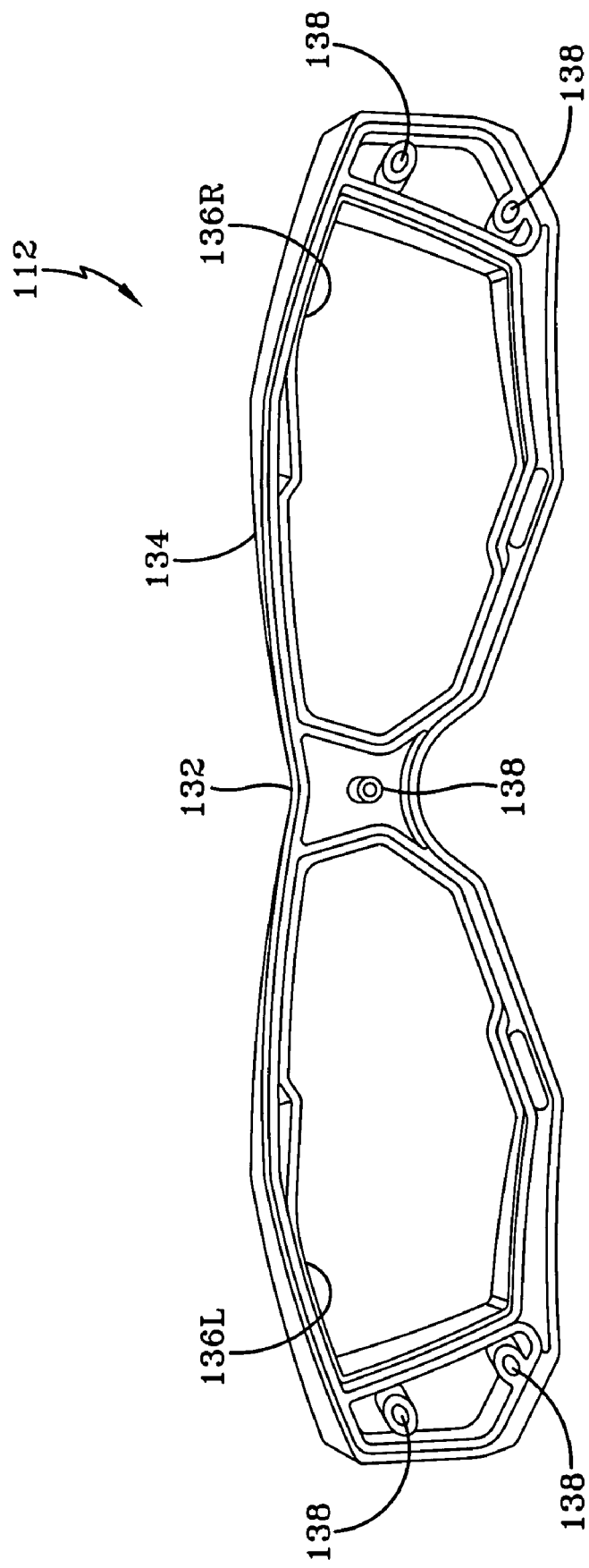
FIG. 8 is an elevational view of a mating surface of the interior frame shown in FIG. 7.

Referring now to FIGS. 7 and 8, it can be seen that a lateral split frame construction is designated generally by the numeral 110. The split frame 110 provides an exterior frame 112 which is mateable with an interior frame 114. Temples 115 are connected to either one or both frames 112 and 114 by a hinge mechanism 117. In this particular embodiment, the interior frame 114 provides hinges and/or temples that are connected to one another. However, it will be appreciated that the hinges and/or temples could be provided by an exterior frame while an interior frame is received by and mates with the exterior frame. In any event, the interior frame 114 provides a peripheral outer edge 116 which defines at least one lens cavity 118. Extending outwardly from the interior frame 114 are a plurality of alignment pins 120.

The exterior frame 112, which may be a separate molded piece or otherwise formed, provides a front face 130 opposite a mating face 132 which faces the interior frame 114. The mating face 132 provides a peripheral ledge 134 which forms a pair of lens cavities 136 which are aligned with the lens cavities 118 of the interior frame. The mating face 132 is also provided with a plurality of alignment sockets 138 which are alignable and mateable with the pins 120. Of course, it will be appreciated that the positioning of pins and sockets may be reversed or alternated in such a manner as deemed appropriate. And the frames 112 and 114 may be joined by a friction fit, interlocking of the frames, adhesive, fasteners or other mechanical attachment mechanisms. Utilizing this construction, a single lens 26' or a pair of lenses 26' may be inserted into the appropriate cavity and are retained when the exterior and interior frames are aligned and attached to one another. In such a configuration, the lens 26' does not require the rigid carrier lens 64 inasmuch as the frames 112 and 114 provide the needed structural support. The lens 26' may also be formed or be flexible enough so as to conform with the shape of the frames. If a single lens 26' is used to span both oculars, then, as will become apparent as the description proceeds, only two electrode tabs are needed for interconnection to the control circuit. The lens 26' may or may not be provided with holes 139 in selected locations to assist in the placement and registration thereof with the pins 120. This construction eliminates the need for cutting or splitting the plastic frame and does not introduce additional stresses upon the lenses that may be otherwise realized by the transverse split frame constructions.

Figure 9:
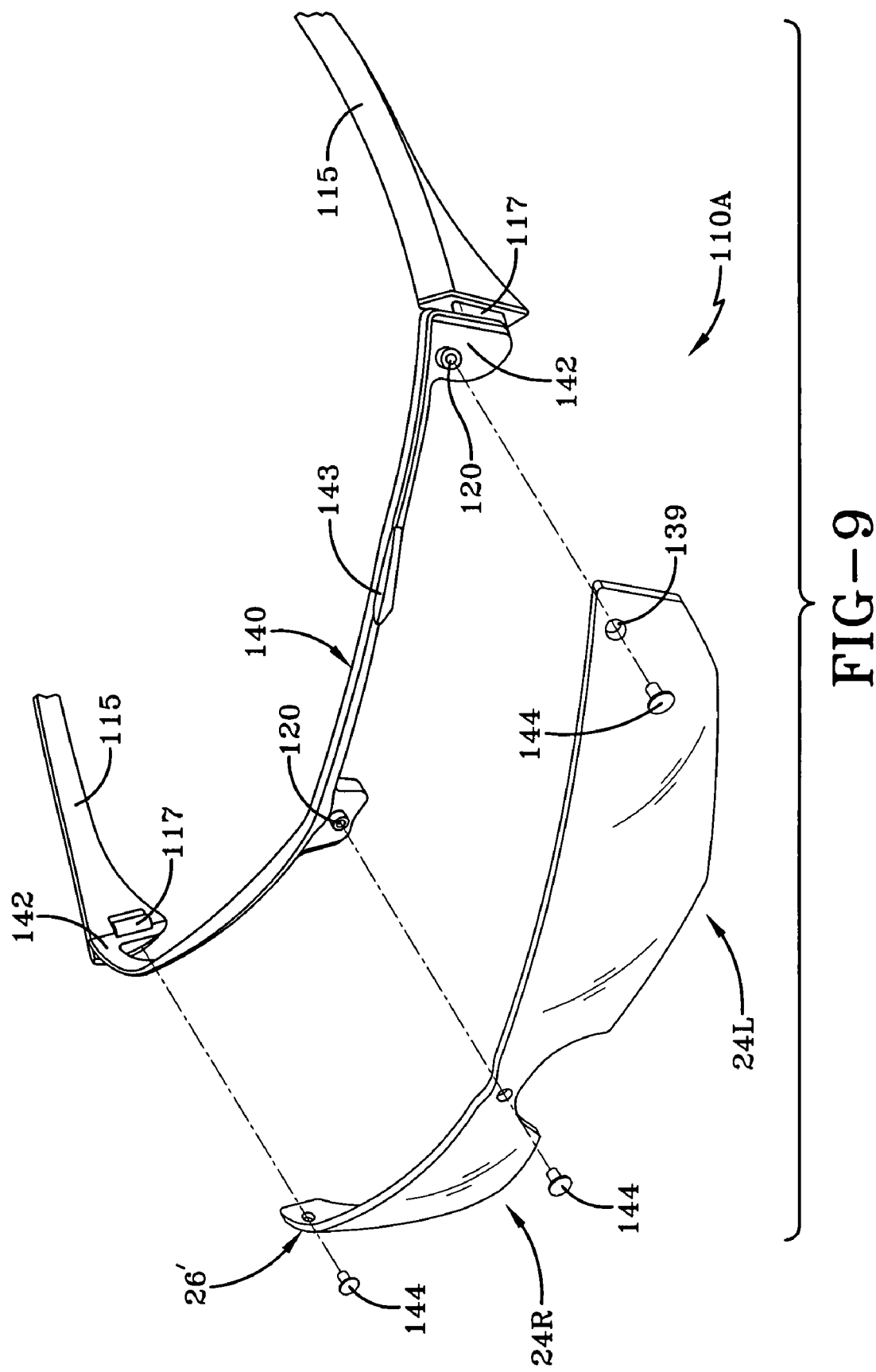
FIG. 9 is an exploded perspective view of an alternative eyewear assembly utilizing a semi-rimless frame and an electro-optic lens according to the present invention.

Referring now to FIG. 9, it can be seen that a semi-rimless frame construction is designated generally by the numeral 110A. The frame 110A provides a beam frame 140 that includes a temple flange 142 at each end. One or more capture ridges 143 may extend from the frame 140. The beam frame 140 may provide an alignment pin 120 associated with the temple flange and at about a mid-point of the beam frame 140. As in the previous frame construction 110, the beam frame 140 is connected to temples 115 at each end by a hinge mechanism 117.

The lens 26', which may be provided with holes 139 extending therethrough that are mateable with the pins 120, is assembled to the beam frame 140. It will be appreciated that the lens 26' may be flexible enough to allow securing to the beam frame 140 and rely on the beam frame for structural support. Or, in the alternative, the lens 26' may be formed so as to substantially conform to the curvature of the beam frame 140. The capture ridge or ridges 143 may form a groove or slot which receives an edge of the lens. This feature assists in securing the lens 26' to the beam frame 140. Adhesives and/or mechanical type fasteners may also be used to carry and/or secure the lens 26' to the frame 140. In one embodiment, buttons 144 may be used to secure the lens 26' to the frame 140. The lens 26' is positioned on the frame with the pins 120 extending through the holes 139. And buttons 144 mate with the pins 120 to secure the lens 26' to the frame 140. Although a single lens 26' is shown, it will be appreciated that a pair of lenses may be used as long as they are properly secured to the beam frame 140. And, as in the previous frame configuration, the lens 26' is provided with electrode tabs that are utilized for interconnection to the control circuit in a manner that will be described.

Figure 10:
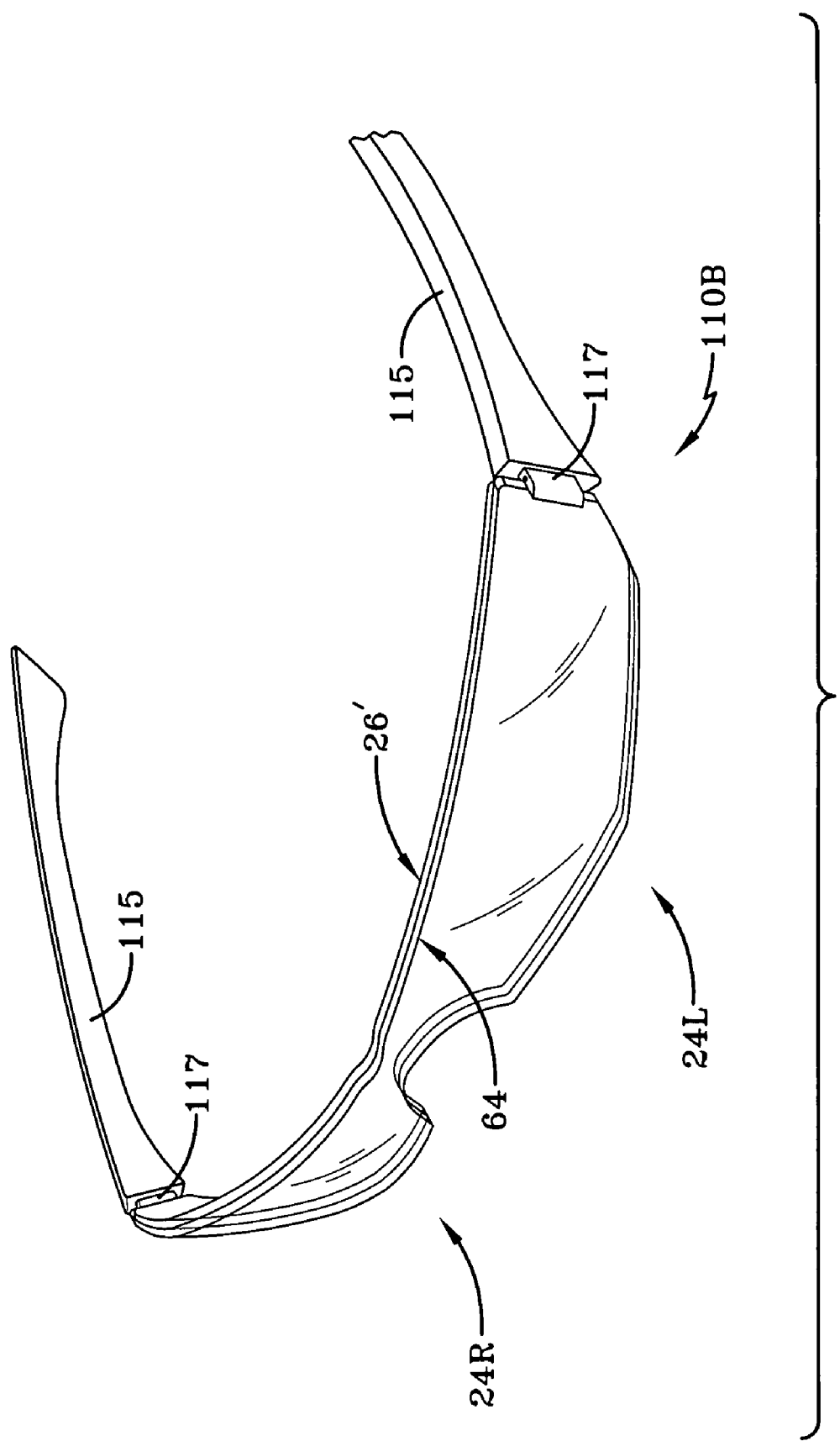
FIG. 10 is a perspective view of another alternative eyewear assembly utilizing a rimless frame and an electro-optic lens according to the present invention.

Referring now to FIG. 10, yet another frame construction is designated generally by the numeral 110B. In this embodiment, the lens 26' is associated with the rigid carrier substrate 64, which is positioned in such a manner that the substrate 64 faces away from the person wearing the eyewear and the lens 26' faces the wearer's face. In this embodiment, the temples 115 are connected to the rigid carrier substrate 64 by utilization of the hinges 117 and temple flanges 142. In other words, the lens 26' is positioned and placed on the rigid carrier substrate 64 in such a manner that the temple flange and the hinge connections do not adversely interfere with the lens 26'. However, the substrate 64 does provide structural support for electrical interconnection between the control circuit maintained in the temple, as will be described, and the electrode tabs provided by the lens 26'. It will further be appreciated that the lens 26 is conformed to the shape of the rigid carrier lens 64 by any number of means such as thermoforming, optical adhesive, or other mechanical interconnection tabs or friction fit with the carrier substrate. Indeed, the carrier substrate 64 may be provided with a built-in ridge or temporary external frame so as to easily fit the lens 26' thereto.

Contact Arrangements

Referring now to FIG. 11, it can be seen that a two contact eyewear assembly arrangement is designated generally by the numeral 150. The assembly 150 includes two lenses 26'L and 26'R, each of which provides two electrode tabs. Specifically, lens 26'L and lens 26'R, wherein only the electrode layers and their tabs 62A and 62B are shown, are each connected to a control circuit 152. It will be appreciated that jumpers are used to interconnect the corresponding tabs to one another and to the control circuit 152. In this particular arrangement, each electrode layer of a lens is provided with a single electrode tab. If appropriate, additional tabs could be provided.

Referring now to FIG. 12, a four contact arrangement eyewear assembly is designated generally by the numeral 160. In this assembly, each lens 162, which is substantially the same as the lens 26' but with additional tabs, is provided with four electrode tabs. As in FIGS. 3 and 9, only the electrode layers and their tabs of a lens are shown. Specifically, lens 162R includes an electrode layer 164A from which extends an electrode tab 166A1 and an electrode tab 166A2 which are substantially diametrically opposed from one another. In a similar manner, the lens 162R includes an electrode layer 164B from which extends an electrode tab 166B1 and an electrode tab 166B2 which are also substantially diametrically opposed to one another. Use of a four contact arrangement assembly (each pair of electrode tabs comprising a contact) allows for use of two control circuits in an eyewear assembly. Specifically, the two lenses 162R and 162L are connected to one another by use of a bridge jumper 168A, which connects the tabs 166A1 to an adjacent electrode tab 166A2, and a bridge jumper 168B which connects tab 166B1 to adjacent tab 166B2. Drive jumpers 170A and 170B connect the electrode tabs of the lens 162L to an adjacent control circuit 152L, while drive jumpers 172A and 172B connect the electrode tabs of the lens 162R to control circuit 152R. Such a construction allows for use of two control circuits where appropriate, or in the event one control circuit fails, the other can take its place.

Figure 13:
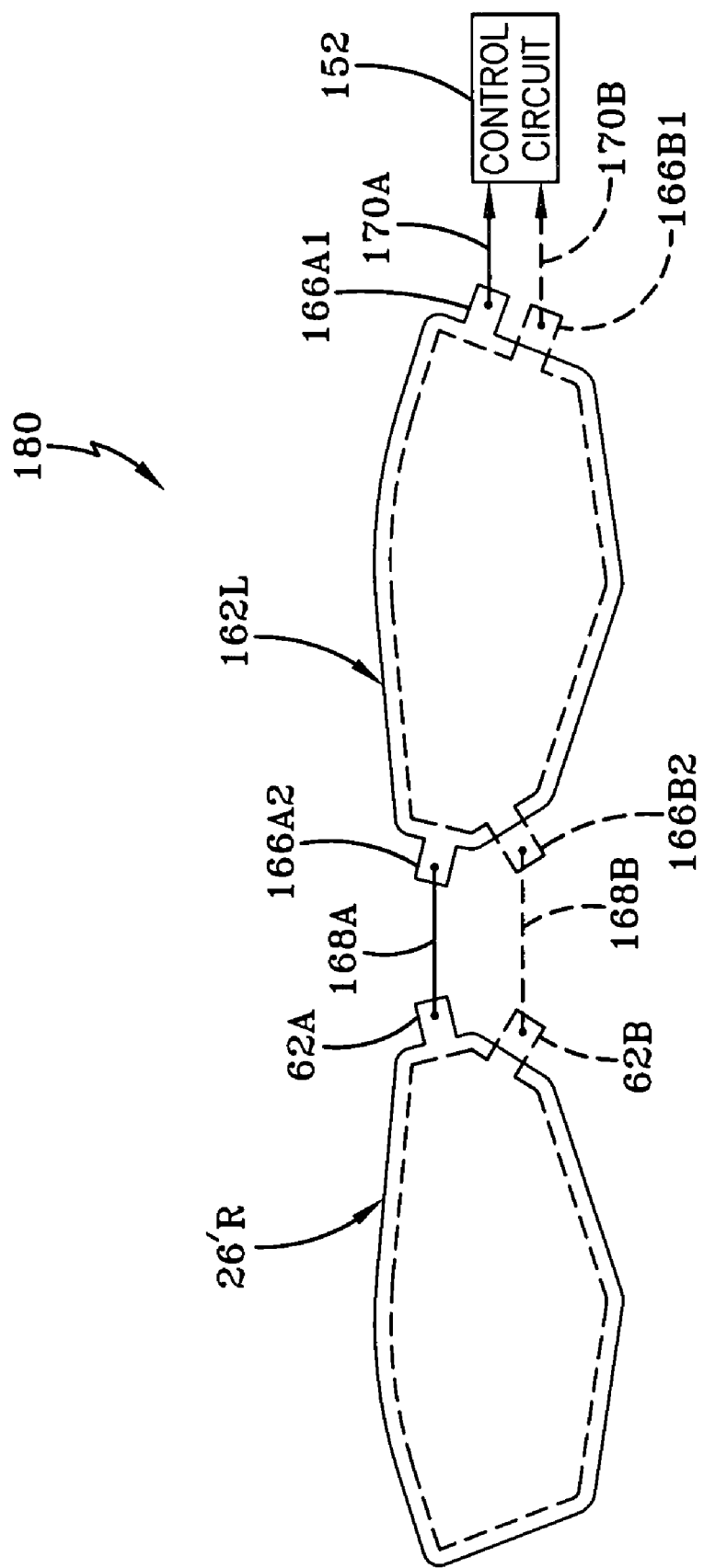
FIG. 13 is a schematic diagram of an alternative eyewear assembly utilizing a four contact arrangement according to another embodiment of the present invention.

Referring now to FIG. 13, an alternative three contact eyewear assembly is designated generally by the numeral 180. The assembly 180 utilizes a combination of a two tab lens 26'R and a four tab lens 162L. In this manner, the control circuit 152 is connected to the lens 162L by drive jumpers 170A and 170B to appropriate electrode tabs 166A1 and 166B1. And lens 26'R is connected to lens 162L by virtue of bridge jumpers 168A and 168B, wherein tab 166A2 and tab 166B2 is connected to electrode tabs 62A and 62B respectively.

Temple-Frame Electrical Interconnection

Figure 14:
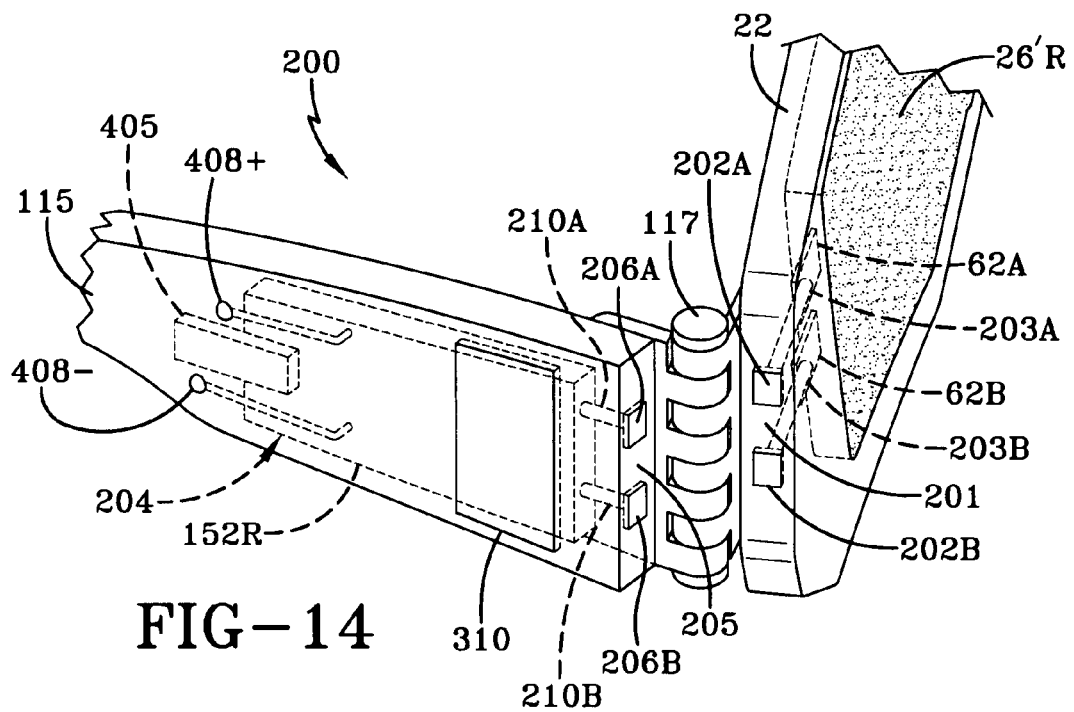
FIG. 14 is an elevational view illustrating a temple-frame connection showing contacts carried by a temple and an adjacent side of a frame according to the present invention.

Referring now to FIG. 14, it can be seen that a temple-frame electrical interconnection is designated generally by the numeral 200. In this embodiment, it can be seen that a frame 22 is connected to a temple 115 by at least one hinge mechanism 117. Of course, other interconnection mechanisms could be used. A lens 26'R is carried by the frame in a manner described above or by a functional equivalent. The frame 22 is configured such that a side edge 201 of the frame, or associated exposed surface, provides for a contact pad 202A and a contact pad 202B. These contact pads are electrically and mechanically connected to the appropriate electrode tabs 62A and 62B of the lens 26R with appropriate conduits 203A and 203B. The pads 202A and 202B may either be flush, recessed, or extend from the side edge 201. And the pads may be in any combination of flush, recessed or extended positions.

The temple 115, which is connected to the hinge 117 or otherwise connected to the frame, may include a circuit cavity 204 to receive an appropriate control circuit which may include a power supply. The temple 115 provides an exposed surface 205 which provides for a contact pin 206A and a contact pin 206B. The pins 206 are aligned with the pads 202 such that when the temple 115 is extended to a wearing position by the user, the pins 206 make electrical contact with the respective pads 202. Accordingly, the control circuit and power supply is appropriately connected to the lens 26'R when the temples are in a wearing position and disconnected when the temples are removed from the wearing position and folded over in a normal manner to a storage position when the eyewear is stored. The pins 206 may also be recessed, flush or extended from the temple surface. The pins may also be spring-biased to ensure contact with the pads when the temple surface 205 abuts the side edge 201. Of course, the pins and pads may be reversed with respect to the temple and the frame.

Figure 15:
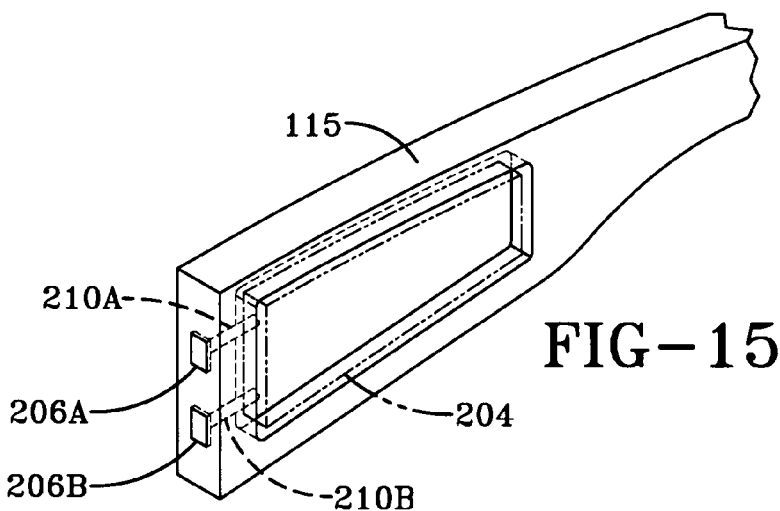
FIG. 15 is a side perspective view of a temple provided with a control circuit cavity according to the present invention.
Figure 16:
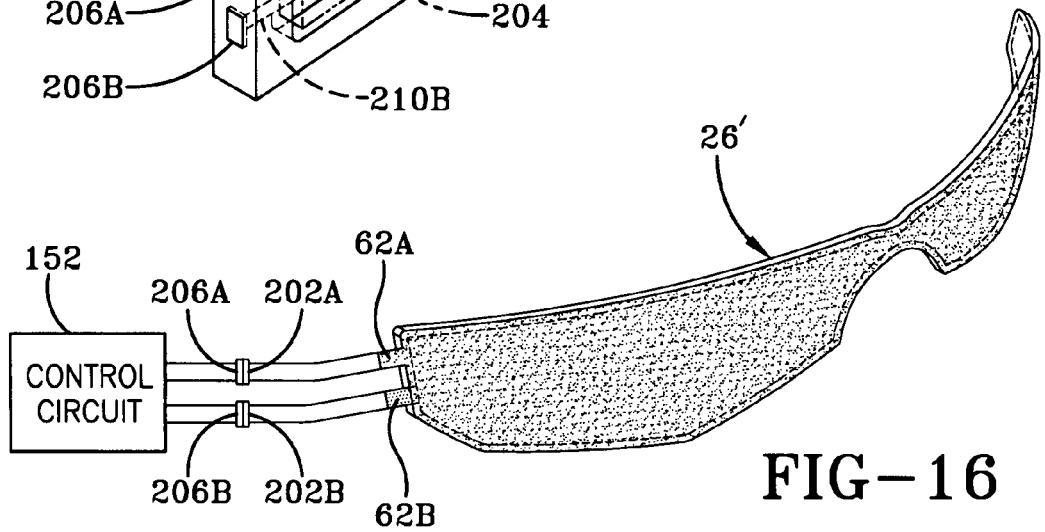
FIG. 16 is a schematic diagram illustrating an electrical interconnection between temple and frame contacts.

FIG. 15 shows the temple in further detail wherein the pads 206A and 206B are provided with appropriate conduits 210A and 210B to allow connection to a control circuit received in the cavity 204. Referring now to FIG. 16, a schematic diagram illustrating the connections between the control circuit 152 and the lens 26' are shown for when the temple is adjacent the frame. As such, the temple and the frame function as a switch controlled by their position with respect to one another.

Eyewear Control Circuits

Figure 17:
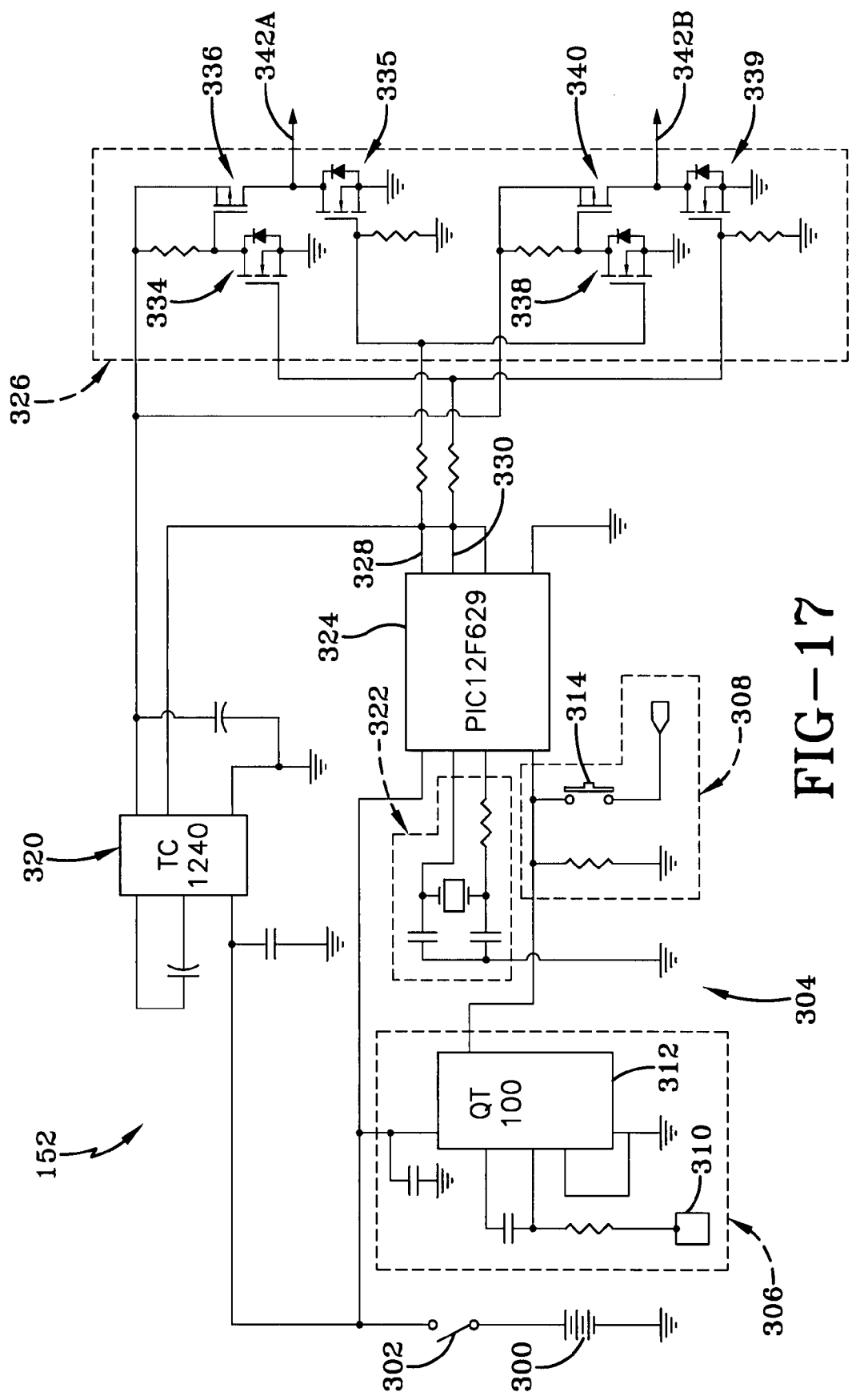
FIG. 17 is a schematic diagram of a drive circuit utilized in accordance with any one of the embodiments described herein.

As best seen in FIG. 17, the control circuit 152 controls the liquid crystal lenses 26L and 26R. As can be seen from the circuit 152, a battery 300 is connected between ground and a master power switch 302. The battery 300 in this embodiment is a 3V lithium rechargeable battery, but other size batteries or solar cells could be used in other embodiments. When the switch 302 is closed, power is supplied to a processor 324 which is a programmable micro-controller adapted for use with the lens 26'. It will be appreciated that the master power switch 302 could be the hinge construction as shown in FIGS. 7-16. In other words, opening of the temples with respect to the frame, such that a user can wear the eyewear will switch the power switch 302 to an on condition, and closing of the temples with respect to the frame into a storage position, which removes contact between the temple surface 205 and the front frame side edge 201 will open the power switch. However, it will be appreciated that the master switch may also be maintained on the temple and/or the frame. In any event, the master switch 302 must be closed for the lenses to be able to change states.

The eyewear control circuit 152 also provides a state change switch 304. When the master switch is on, use of the state change switch 304 allows the user or wearer to control operation of the lens or lenses. It will be appreciated that the state change switch could control a single lens, both lenses—one for the right lens and one for the left lens—or that two switches 304 could be provided, one for each lens. The state change switch 304 may either be in the form of a touch switch circuit 306 (which will be further described in regard to FIG. 17) or a button switch circuit 308. Briefly, the touch switch circuit 306 allows for a user to simply touch an appropriate spot on the frame and/or temple which causes a signal to be generated to actuate the lens or lenses, or a button switch circuit may be used which requires actuation of a button or other type of toggle to control operation of the lens or lenses. The touch switch circuit 306 includes a touch plate 310 which is easily accessible by the user. In most embodiments, it is envisioned that the touch plate 310 will be carried by the temple; however, it will be appreciated that the touch plate could be in any other convenient location. The touch plate 310 is connected to a touch switch processor 312 which generates a signal that is input to the processor 324. It is also possible to eliminate the processor 312 by incorporating its functionality directly into processor 324. In the alternative, the button switch circuit 308 includes a push button 314 which also generates a signal that is input to the processor 324. It is envisioned that either the circuit 306 or the circuit 308 will be attached to the processor 324, but not both.

In this embodiment, the processor is run at about a 32 kHz frequency as generated by an oscillator 322 which is connected to the processor 324; however, other compatible frequencies could be utilized.

A voltage doubler 320 is connected between the master power switch 302 and the two-channel buffer 326. The processor 324 also receives power from the battery and receives input from the state change switch 304 which may be either in the form of the touch switch circuit 306 or the button switch circuit 308. The voltage doubler 320 receives the battery input power and doubles it from the three volt values typically supplied by the battery 300, and increases it to about six volts so as to allow for application of the appropriate voltage to drive the liquid crystal lenses. The processor 324, upon receiving input from either one of the state change switches, sends appropriate control signals to the two-channel buffer— at a lower voltage value—to control operation of the lenses. In other words, lower power values are only required to control the state of the lens or lenses, while the higher voltage values are utilized to drive the optical state of the lenses. The processor 324 can turn off the voltage doubler 320 if the state change switch 304 does not select the high voltage or on state of the lenses. This configuration allows for use of a smaller battery to drive the lenses only when needed, thus saving power and allowing for a smaller size battery to be used.

The processor 324 generates two control signals 328 and 330 which are received by the two-channel buffer 326. The buffer receives power from the voltage doubler and generates output signals carried on outputs 342A and 342B as determined by the control signals 328 and 330. Specifically, the buffer 326 includes a plurality of MOSFETs 334, 335, 336, 338, 339, and 340 which coact with one another to generate the output signals 342A and 342B which are connected to and received by corresponding electrodes of the lens 26'. The MOSFETs 334, 335, 338 and 339 are further provided with diodes that are connected across their respective drain and source terminals. Output 328 from the controller 324 is received by the gates of MOSFETs 335 and 338; and output 330 from the controller 324 is received by the gates of MOSFETs 334 and 339. MOSFETS 334 and 336, and MOSFETs 338 and 340 receive output generated by the voltage doubler 320. The output signals 342A and 342B are generated from corresponding connections between MOSFETs 335 and 336, and MOSFETs 339 and 340. It will be appreciated that the eyewear control circuit 152 provides other resistors and capacitors associated with the processor 324, the doubler 320, and the switch circuits 306 and 308 in a manner consistent with the operation of a liquid crystal or elecro-optic device. In any event, the state change switch 304 is also connected to the processor 324 so as to allow for actuating the lens. It will be appreciated that the master power switch 302, when in an on condition, maintains constant application of power to enable operation of the state change switch 304. This allows for actuation of the lens to its different operational states via the leads connected to output terminals of the processor 324. However, when the eyewear is not to be used, such as when the user is traveling or the like, the master power switch can be turned off so as to prevent unwanted power drain, thus preserving the life of the battery.

The control circuit embodiment show in FIG. 17 utilizes a processor 324. This configuration works well and allows for programming of the processor to provide the lens operation with enhanced functionality so that it is adaptable to different eyewear configurations. However, it will also be appreciated that simplified versions of the above can be used. Accordingly, depending upon the desired functionality of the eyewear, the size of the battery that can be carried by the eyewear, and the type of switching functions desired, different circuit configurations can be used. At a minimum, a control circuit for the liquid crystal eyewear requires a battery, a switch, and an oscillator. Use of the oscillator is required to ensure that the plurality of voltages applied across the lens change on a predetermined frequency, such as 60 Hz, so as to ensure long life of the lens. Skilled artisans will appreciate that if the oscillator is not used, the liquid crystal material used in a liquid crystal lens eventually degrades. In any event, depending upon the battery size utilized, a voltage doubler may be required, and also depending upon the type of switch utilized, a toggle circuit may also be required.

Referring now to FIG. 18, it can be seen that a control circuit is designated generally by the numeral 152A. This circuit employs a power source 350, which in this embodiment is six volts, although any size battery could be used with this configuration. The circuit also includes a switch 351 which, in this embodiment, is a slide-switch. Accordingly, whether the switch is either in an open position or in a closed position is easily determined by the user. When the switch is closed, an appropriate voltage is applied to an oscillator 352 along input line 353. The oscillator 352 consists of a monostable/astable multivibrator 357, a resistor 354, and a capacitor 355. The frequency of the oscillator 352 is controlled by the selection of values for resistor 354 and capacitor 355. The oscillator output is available on lines 356A and 356B which are connected to the liquid crystal lens in any of the manners described herein.

Referring now to FIG. 19, an alternative drive circuit is designated generally by the numeral 152B. In the event a three volt battery is utilized for the power source 350 in a circuit with a functionality as shown in FIG. 17, then a voltage doubler designated generally by the numeral 360 is connected between the switch 351 and the oscillator 352. The voltage doubler increases the voltage to a value needed to drive the liquid crystal lenses.

Figure 20:
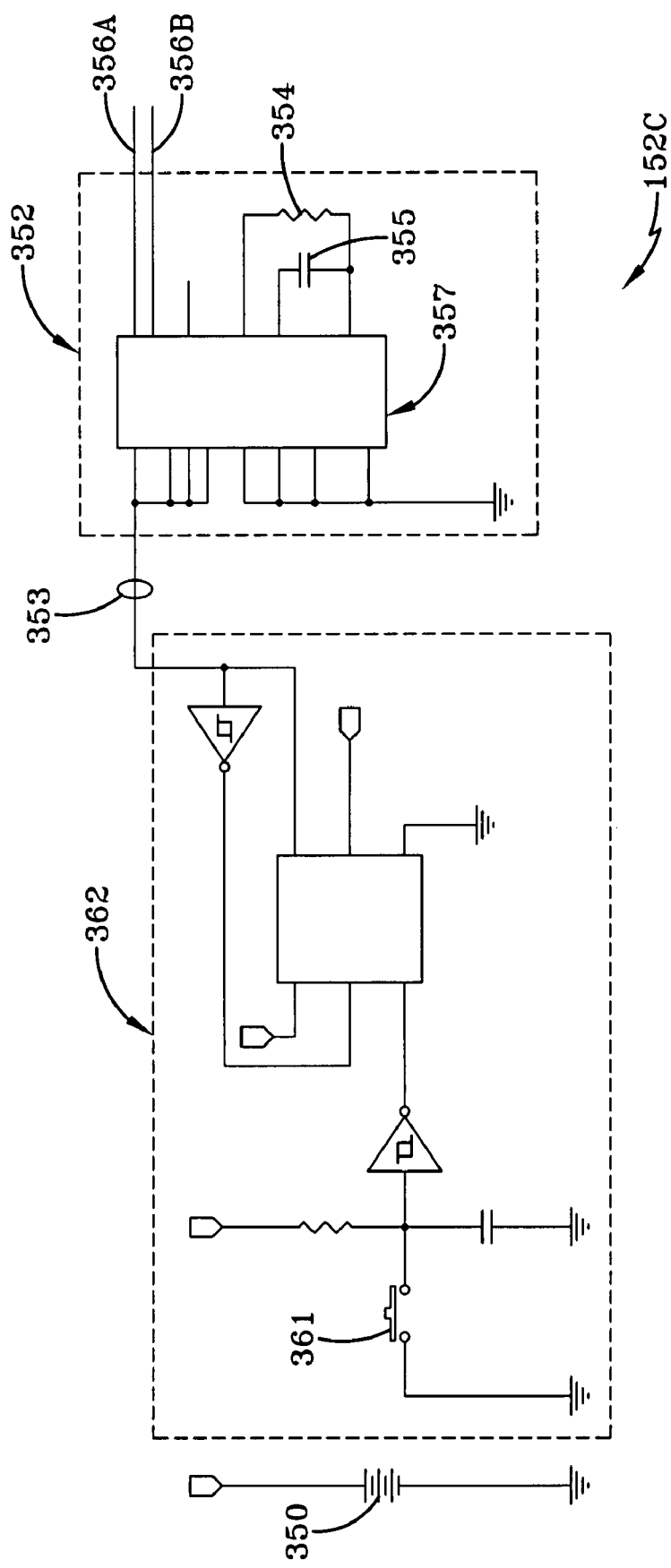
FIG. 20 is a schematic diagram of still another alternative drive circuit utilized in accordance with any one of the electro-optic eyewear embodiments described herein.

Referring now to FIG. 20, it can be seen that yet another power control circuit is designated generally by the numeral 152C. In this embodiment, a momentary contact switch 361 is utilized in conjunction with the power source 350, which in this embodiment is a six volt battery. Use of a momentary contact switch 361 necessitates a toggle circuit 362 with its associated operational amplifiers. Use of the toggle circuit 362 is required so that the electrical "bounce" of the momentary contact switch 361 is compensated for and to ensure that the desired on or off condition is maintained. The desired output of toggle circuit 362 is received by the oscillator 352 which in turn operates in the manner previously described.

Figure 21:
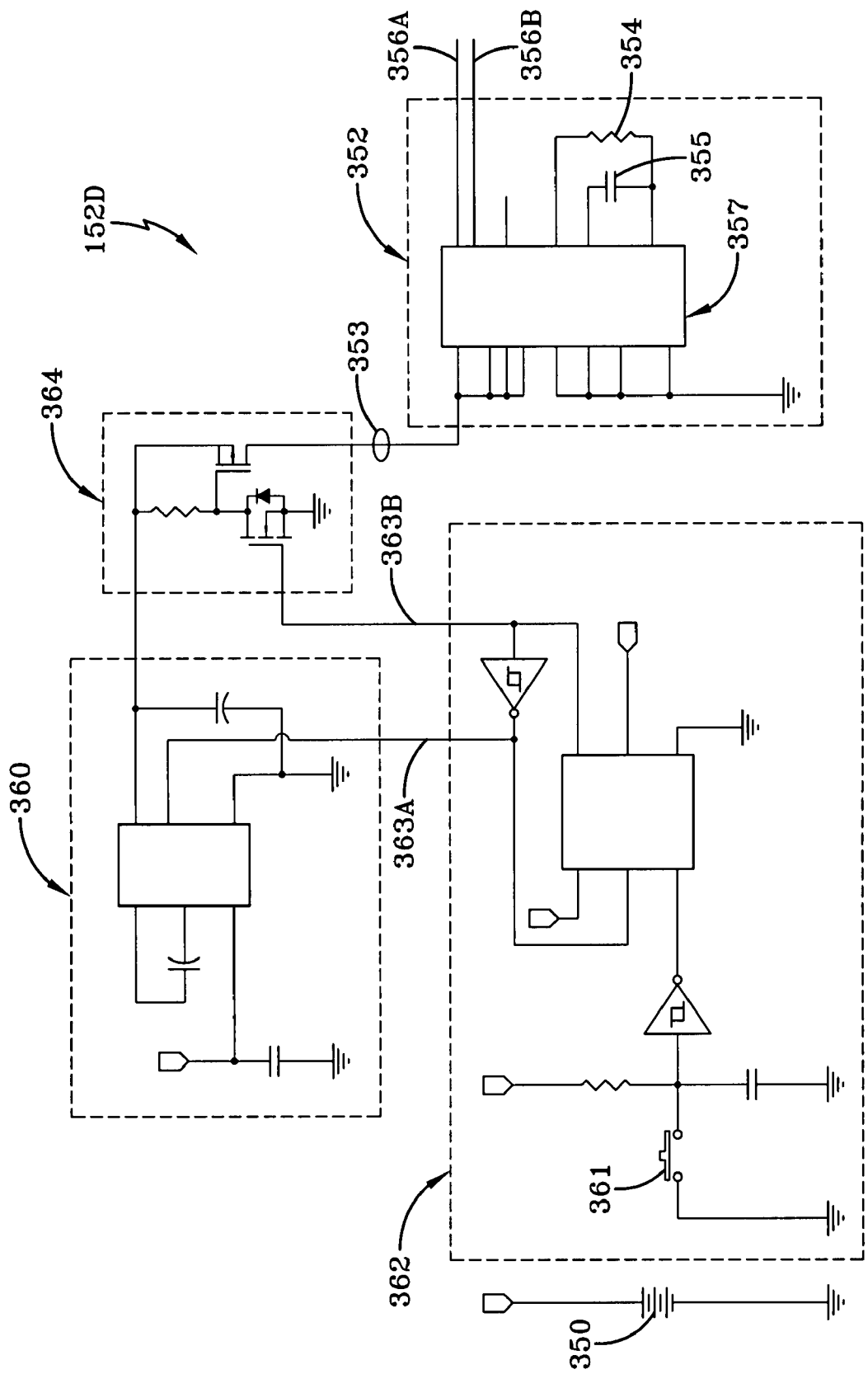
FIG. 21 is a schematic diagram of yet another alternative drive circuit utilized in accordance with any one of the electro-optic eyewear embodiments described herein.
Figure 25:
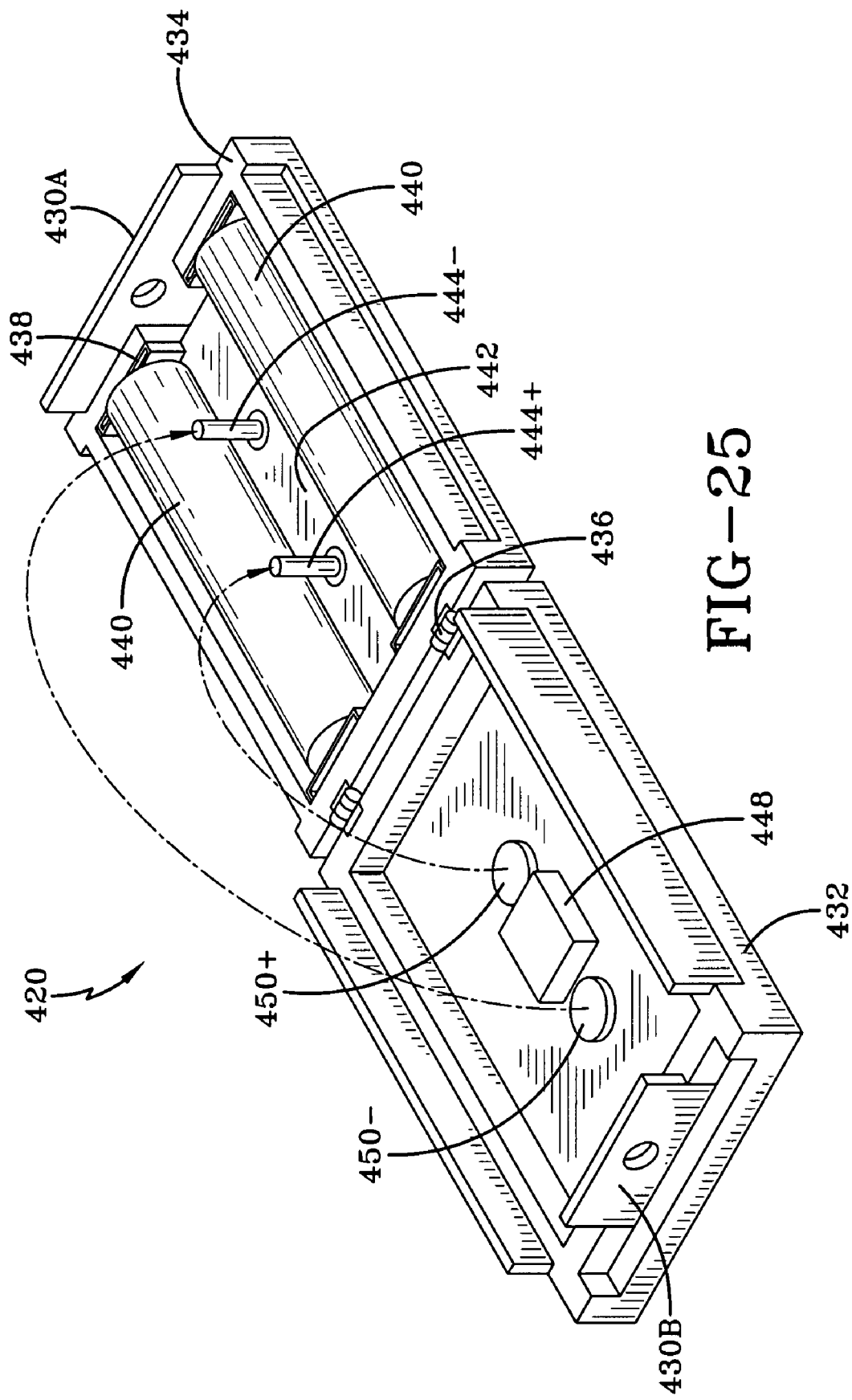
FIG. 25 is a perspective view showing the recharging unit in an open position to show details thereof.

Referring now to FIG. 21, yet another alternative drive circuit is designated generally by the numeral 152D. This embodiment is much the same as shown in FIG. 20, however, only a three volt battery is used for the power source 350, and as such a voltage doubler 360 is required. A digital switch 364, which may incorporate a field effect transistor, is connected between the voltage doubler and the oscillator and controls the voltage applied to oscillator input 353. As can be seen, the toggle circuit has two outputs, 363A and 363B. Output 363A controls the voltage doubler and output 363B controls the digital switch 364. These outputs operate so that the voltage doubler 360 and the digital switch 364 are either both on or both off. In the on state, the voltage doubler 360 applies six volts to the digital switch 364, which, since it is in its on state, applies the six volts from the voltage doubler 360 to the oscillator input 353. In the off state, the voltage doubler is off thereby conserving battery power, and the digital switch 364, since it is in its off state, applies zero volts to the oscillator input 353. The oscillator 352 operates in the manner previously described in the other embodiments.

Eyewear Recharging Unit

Referring now to FIGS. 22-24, it can be seen that an eyewear assembly is designated generally by the numeral 400. As in the previous embodiments, the assembly 400 includes a frame front 402 which carries at least one electro-optic lens. Extending from the frame front 402 is a temple 115 which may be connected to the frame front by a hinge 117. This construction may utilize the frame-temple interconnection embodiment as shown in FIGS. 7-16. In this embodiment, the temple 115 provides a temple inner surface 404 and a temple outer surface 406. The touch plate 310, as discussed in regard to the control circuit 152, is positionable upon the temple outer surface 406. However, it will be appreciated that the touch plate 310 may be placed anywhere on the eyewear assembly.

Extending from the temple outer surface 406 are a pair of temple contacts 408, wherein each contact is associated with a battery terminal. In other words, one temple contact 408 is a positive (+) terminal and the other temple contact is a negative (−) terminal. These temple contacts are electrically and mechanically connected to the battery 300 powering the eyewear control circuit 152. Although the contacts 408 are associated with the temple, other embodiments may utilize a frame 22 which maintains a cavity for receipt of the battery, or the battery and the control circuit. As such, the contacts may be provided with the frame instead of the temple.

The recharging unit, designated generally by the numeral 420 is associated with the eyewear assembly for the purpose of recharging the battery 300 powering the lens or lenses of the eyewear. This allows for a relatively small battery to be maintained by the eyewear and provide an extended period of use without having to use a large battery which is incompatible for carrying on an eyewear frame. Although it will be appreciated that in some embodiments a solar power cell may be utilized with the eyewear, it is believed that a rechargeable type battery is most efficient and adaptable for any number of applications associated with the eyewear. In any event, the recharging unit 420 provides a housing 422 which in this embodiment is a plastic molded construction. One side of the housing 422 provides a temple cavity 424 which may be slightly recessed with respect to the remainder of the housing. A pair of recharge pads 426+ and 426− are maintained within the cavity 424. The pads 426 may be flush or at least above the surface of the temple cavity so as to allow for mateable contact with the temple contacts 408. Accordingly, when it is desired to recharge the battery maintained by the liquid crystal eyewear, the temple 115 is simply positioned so that the temple contacts 408 are in electrical and mechanical connection with the respective recharge pads 426.

The housing may also provide a latching mechanism 430 which consists of two overlapping plates 430A and 430B, both plates having bores that align with each other when the housing is closed and, when aligned, will accept a fastening device 431 to securely close the housing. The fastening device 431A may fit flush to the surface of the latching mechanism. In the alternative, the fastening device 431B may allow for carrying of the eyewear recharging unit 420 on a key ring or the like.

The housing 422 provides a cover 432 which may be hinged or otherwise connected to a tray 434. A hinge 436 may be provided between adjacent and respective ends of the cover 432 and the tray 434 so as to allow for opening and closure of the housing 422. The tray 434 includes a battery tray 438 which carries batteries 440. The batteries 440 may be AA, AAA or other appropriately sized batteries so as to provide charging power to the battery 300 powering the control circuit 152. Associated with the batteries is a charger circuit 442. A typical charger circuit includes a Li-polymer charge management controller such as a MicroChip Technologies MCP73843. Extending from the charger circuit board 442 are a pair of probes 444+ and 444− which may be spring-biased. An inside surface of the tray provides a lid magnet 448 and a pair of lid pads 450+ and 450− which are integrally connected with the respective recharge pads 426+ and 426−. Accordingly, when the cover 432 is closed, the probes 444 make contact with the lids pads 450 so as to allow for application of a charging voltage through the recharge pads 426 whenever temple contacts 408 make contact therewith. It will be appreciated that the temple 115 may carry a temple magnet 405 so as to allow for proper mounting of the temple 115 onto the recharging unit 420. This allows for proper positioning of the temple 115 with respect to the recharging unit to ensure proper charging of the battery maintained by the eyewear. It will further be appreciated that the recharging unit may provide LEDs or other visual indicators of when the battery maintained by the eyewear is fully charged. Indeed, this visual indicator can be controlled by the charger circuit board.

Figure 26:
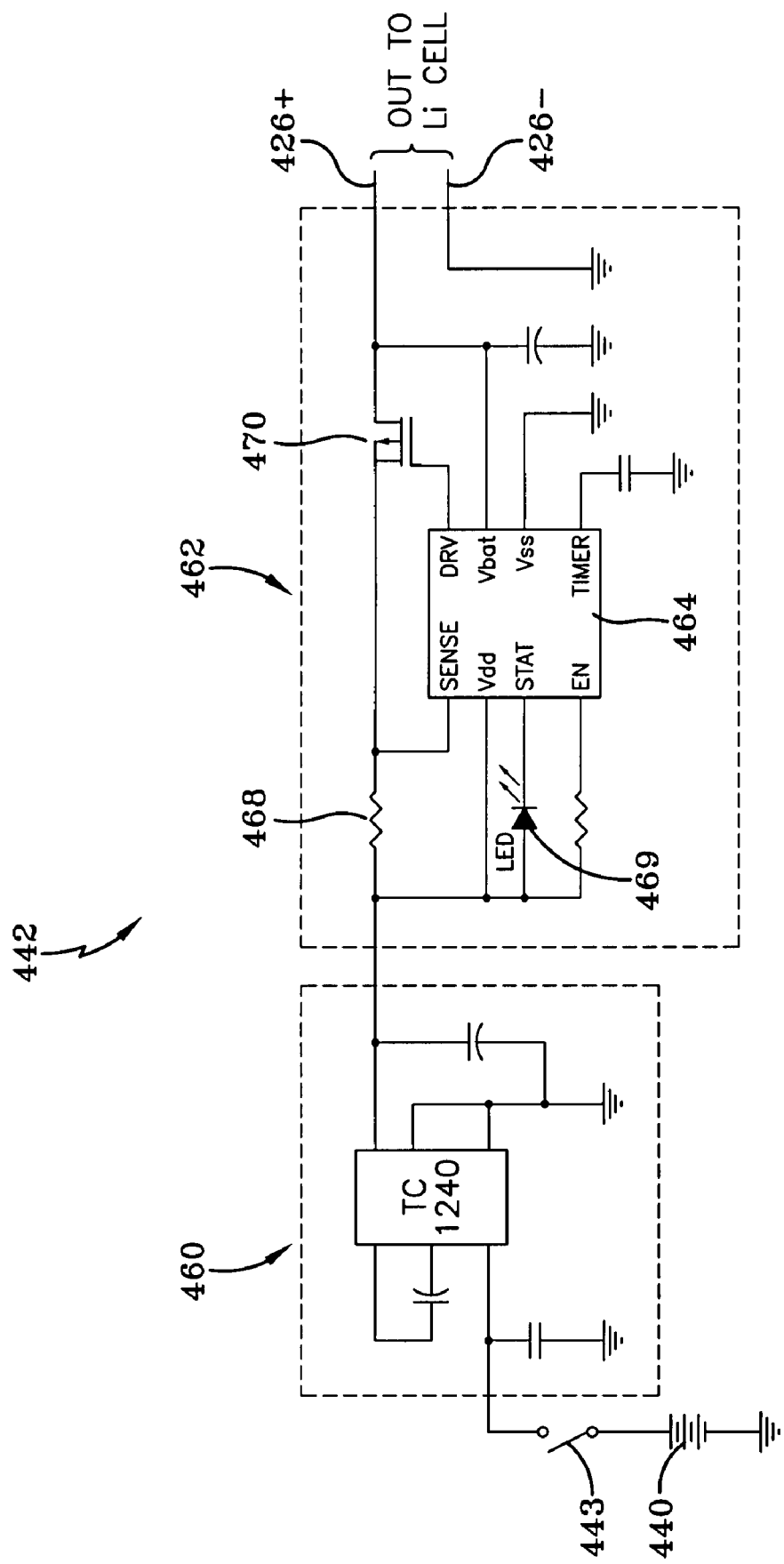
FIG. 26 is a schematic diagram of a recharging circuit carried by the recharging unit.

Referring now to FIG. 26, a recharging circuit is designated generally by the numeral 442. The circuit 442 utilizes a voltage doubler 460 which is connected to the power supply, namely the batteries 440, through a switch 443 which allows the recharging circuit to be turned off when not in use. The voltage doubler 460 is connected to a control circuit 462 which utilizes a controller 464, which in the present embodiment is a charge management controller such as a MicroChip Technologies MCP73843. An LED 466 is connected to the controller 464 so as to provide a visual output as to the status of the charging circuit 442. The value of the control resistor 468 sets the maximum output current of the charging circuit, which is actually controlled by the field effect transistor (FET) 470. The state of charge of the batteries carried by the eyewear is determined by the controller 464 which measures the voltage of the batteries at the probes 426. When charging is complete, the controller 464 turns off the FET 470, thereby disconnecting the batteries from the voltage doubler 460.

The advantages of the charging circuit allow for use of a voltage doubler so as to convert three volts from two batteries into six volts needed to operate the controller 464. The design of the eyeglass driver circuit and battery pack recharger make it possible to use the recharger as an auxiliary power source for the eyewear should the need arise. Moreover, the drive circuit of the eyewear draws only one mA and the recharger is configured to deliver 20 mA. Such a configuration allows for a compact recharging circuit that can be easily carried and used to recharge the batteries maintained by the eyewear as needed.

Use of the recharger circuit 442 is advantageous in that it allows for a minimal size battery to be used by the eyewear and allows for a convenient recharging of the eyewear battery when not in use. Moreover, the control circuit 152 provides an advantage in that only a minimum use of power is required to operate the device while still maintaining a compact and size-efficient control circuit, with minimal weight.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. An electro-optic eyewear assembly, comprising:
a frame having opposed ends;
at least one moveable temple;

a hinge mechanically interconnecting said temple to a corresponding end of said frame, wherein said temple is moveable between a wearing position and a storage position;

at least one electro-optic lens carried by said frame wherein said electro-optic lens includes a pair of extending electrode tabs; and a control circuit carried by said temple, wherein said temple comprises a pair of contact pins each of which is mateable with a corresponding one of said electrode tabs to provide electrical connection between said control circuit and said at least one electro-optic lens when said temple is moved to said wearing position.

2. The assembly according to claim 1, wherein said frame comprises:
   a rigid carrier lens, wherein said at least one electro-optic lens is secured to said rigid carrier lens and substantially conforms thereto.

3. The assembly according to claim 2, wherein said rigid carrier lens is between 1 to 3 millimeters thick and made from polycarbonate material.

4. The assembly according to claim 1, wherein said frame comprises:
   an interior frame carrying said hinge, said interior frame having a peripheral outer edge that forms at least one lens cavity; and
   an exterior frame having a peripheral outer ledge, said peripheral outer edge mateable with said peripheral outer ledge so as to form at least one lens cavity for receiving and carrying said at least one electro-optic lens.

5. The assembly according to claim 4, wherein at least one of said interior and exterior frames provides a bridge so as to separate said one lens cavity into two cavities, and wherein said at least one electro-optic lens extends across said two cavities.

6. The assembly according to claim 1, wherein said frame comprises:
   opposed side edges, one of said side edges carrying electrically conductive contact pads, each of which is connected to a corresponding one of said electrode tabs.

7. The assembly according to claim 1, wherein one of said contact pads and said contact pins is spring-biased.

8. The assembly according to claim 7, wherein said temple includes a circuit cavity for carrying said control circuit, said temple having an outer surface; and said control circuit comprising a touch switch circuit to change an optical state of said electro-optic lens, wherein at least a portion of said touch switch circuit is exposed on said temple outer surface such that actuation of said portion generates a signal to change said optical state.

9. The assembly according to claim 7, wherein said temple includes a circuit cavity for carrying said control circuit, said temple having an outer surface; and said control circuit comprising:
   a pair of contacts exposed on said outer surface; and
   a rechargeable battery having terminals wherein each said terminal is connected to one of said contacts.

10. The assembly according to claim 9, further comprising:
    a magnet carried by said temple, said magnet adapted to align said temple and said pair of contacts with a battery charger.

11. The assembly according to claim 1, wherein said temple includes a circuit cavity, said control circuit received in said circuit cavity, said control circuit comprising:
    a power supply;
    an on/off switch connected to said power supply, said switch when in an on condition generates an input signal; and
    an oscillator that receives said input signal so as to apply a voltage to said electro-optic lens at a selected frequency.

12. The assembly according to claim 11, wherein said control circuit further comprises:
    a voltage doubler connected between said switch and said oscillator.

13. The assembly according to claim 11, wherein said control circuit further comprises:
    a toggle circuit connected between said switch and said oscillator, said toggle circuit eliminating electrical bounce generated by closure of said on/off switch.

14. The assembly according to claim 11, wherein said control circuit further comprises:
    a toggle circuit connected between said switch and said oscillator, said toggle circuit eliminating electrical bounce generated by closure of said on/off switch;
    a voltage doubler connected between said switch and said oscillator; and
    a digital switch connected between said voltage doubler and said oscillator, said digital switch controlling an amount of voltage applied to said oscillator.

* * * * *